US012803734B2

(12) United States Patent
Shariatmadari et al.

(10) Patent No.: US 12,803,734 B2
(45) Date of Patent: Nov. 17, 2026

(54) USER EQUIPMENT, SCHEDULING NODE, METHOD FOR USER EQUIPMENT, AND METHOD FOR SCHEDULING NODE TO DETERMINE WHETHER OR NOT TO USE A TRANSMISSION OPPORTUNITY FOR TRANSMITTING THE AVAILABLE UCI

(71) Applicant: Panasonic Intellectual Property Corporation of America, Torrance, CA (US)

(72) Inventors: Hamidreza Shariatmadari, Langen (DE); Hidetoshi Suzuki, Kanagawa (JP); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 275 days.

(21) Appl. No.: 18/565,874

(22) PCT Filed: May 30, 2022

(86) PCT No.: PCT/EP2022/064518
§ 371 (c)(1),
(2) Date: Nov. 30, 2023

(87) PCT Pub. No.: WO2022/253719
PCT Pub. Date: Dec. 8, 2022

(65) Prior Publication Data

US 2024/0267179 A1 Aug. 8, 2024

(30) Foreign Application Priority Data

Jun. 4, 2021 (EP) .................................... 21177810

(51) Int. Cl.
*H04L 5/00* (2006.01)
*H04L 1/1812* (2023.01)
(Continued)

(52) U.S. Cl.
CPC .......... *H04L 5/0048* (2013.01); *H04L 1/1812* (2013.01); *H04L 1/1854* (2013.01); *H04L 5/0055* (2013.01); *H04W 72/21* (2023.01)

(58) Field of Classification Search
CPC ....... H04L 1/0027; H04L 1/08; H04L 1/1614; H04L 1/1812; H04L 1/1819;
(Continued)

(56) References Cited

U.S. PATENT DOCUMENTS 11,909,693 B2 * 2/2024 Song ................. H04W 72/0446
12,041,648 B2 * 7/2024 Lee ....................... H04L 5/1469
(Continued)

FOREIGN PATENT DOCUMENTS

CN 111418179 A 7/2020
JP 2020504524 A 2/2020

OTHER PUBLICATIONS

U.S. Appl. No. 63/085,435 (Year: 2020).*
(Continued)

*Primary Examiner* — Dung B Huynh
(74) *Attorney, Agent, or Firm* — Seed Intellectual Property Law Group LLP

(57) ABSTRACT

The disclosure relates to a communication device, a base station and respective methods for a communication device and a base station. More specifically, the communication device obtains an indication indicating a plurality of transmission opportunities for transmission of UCI. If UCI becomes available for transmission, the communication device determines, based on priority criteria associated with the available UCI, whether to use a transmission opportunity
(Continued)

among the plurality of transmission opportunities for transmitting the available UCI. If it is determined that the transmission opportunity is to be used for transmitting the available UCI, the communication device uses the transmission opportunity for transmitting the available UCI.

13 Claims, 9 Drawing Sheets

(51) Int. Cl.
*H04L 1/1829* (2023.01)
*H04W 72/21* (2023.01)

(58) Field of Classification Search
CPC ... H04L 1/1822; H04L 1/1825; H04L 1/1854; H04L 1/1861; H04L 1/1896; H04L 5/0048; H04L 5/0053; H04L 5/0055; H04L 5/0064; H04L 5/0091; H04W 72/21
See application file for complete search history.

(56) References Cited

U.S. PATENT DOCUMENTS

2018/0175973 A1* 6/2018 Rosa .................... H04L 5/0055
2018/0227944 A1* 8/2018 Yerramalli ........ H04W 72/1268
2018/0352575 A1* 12/2018 You ....................... H04W 72/23
2019/0053097 A1* 2/2019 Rico Alvarino ...... H04L 5/0064
2019/0174518 A1* 6/2019 Jiang ..................... H04L 5/0094
2019/0174521 A1* 6/2019 Liu ........................ H04W 28/02
2019/0205169 A1* 7/2019 Lee ....................... G06F 9/4887
2019/0215823 A1* 7/2019 Kim ...................... H04L 1/0031
2019/0306922 A1* 10/2019 Xiong .................. H04W 72/21
2019/0313436 A1* 10/2019 Lee ...................... H04L 5/0094
2019/0319768 A1* 10/2019 Wu ....................... H04W 76/50
2019/0327726 A1* 10/2019 Zhang .................. H04B 7/0632
2020/0163081 A1 5/2020 Kim et al.
2020/0213044 A1* 7/2020 Peng ..................... H04L 1/1864
2020/0228173 A1* 7/2020 Ye ........................ H04B 7/0478
2020/0228248 A1* 7/2020 Islam .................... H04L 5/0055
2020/0229211 A1* 7/2020 Hosseini ............. H04W 72/566
2020/0305191 A1* 9/2020 Moon ................... H04W 72/23
2020/0322980 A1* 10/2020 Fakoorian ............ H04W 76/11
2020/0351867 A1* 11/2020 Guo ...................... H04L 5/0051
2020/0374912 A1* 11/2020 Takeda .................. H04L 1/1854
2020/0413425 A1 12/2020 Lin et al.
2021/0007129 A1* 1/2021 Talarico ............ H04W 72/1268
2021/0037554 A1* 2/2021 Kim ...................... H04L 5/0092
2021/0068140 A1* 3/2021 Yang ..................... H04W 72/23
2021/0105126 A1* 4/2021 Yi ......................... H04W 76/27
2021/0160011 A1* 5/2021 Bang ..................... H04L 1/1812
2021/0168834 A1* 6/2021 Chen ....................... H04L 5/001
2021/0195630 A1* 6/2021 Taherzadeh Boroujeni ............... H04W 72/0446
2021/0204142 A1* 7/2021 Tang ................. H04W 72/0446
2021/0219298 A1* 7/2021 Xue ....................... H04W 72/53
2021/0274531 A1* 9/2021 Yamamoto ........ H04W 72/0446
2021/0274543 A1* 9/2021 Ryu ...................... H04W 72/56
2021/0307004 A1* 9/2021 Zhang ................... H04L 1/1819
2021/0368453 A1* 11/2021 Lee ..................... H04W 52/146
2022/0060288 A1* 2/2022 Sun ....................... H04W 72/23
2022/0078832 A1* 3/2022 Elshafie ................ H04W 72/21
2022/0086887 A1* 3/2022 Elshafie ................ H04L 5/0044
2022/0095335 A1* 3/2022 Gao ........................ H04L 1/189
2022/0103304 A1* 3/2022 Elshafie ................ H04L 1/1819
2022/0159657 A1* 5/2022 Shimomura .......... H04W 16/14
2022/0167348 A1* 5/2022 Yang ..................... H04L 5/0044
2022/0183061 A1* 6/2022 Wang .................... H04L 5/0044
2022/0210823 A1* 6/2022 Alfarhan ............... H04L 1/1822
2022/0231798 A1* 7/2022 Bae ....................... H04L 1/1854
2022/0232487 A1* 7/2022 Yang ..................... H04W 52/20
2022/0232556 A1* 7/2022 Ren ....................... H04W 72/23
2022/0232629 A1* 7/2022 Lin ..................... H04L 27/0006
2022/0240273 A1* 7/2022 Pezeshki ............... H04L 5/0048
2022/0278779 A1* 9/2022 Mu ....................... H04L 1/1861
2022/0279507 A1* 9/2022 Takahashi ............ H04W 72/21
2022/0279538 A1* 9/2022 Jung ................... H04W 72/542
2022/0322336 A1* 10/2022 Sridharan ............ H04L 5/0053
2022/0361152 A1* 11/2022 Xue ...................... H04L 1/1861
2022/0361162 A1* 11/2022 Zhang ................... H04L 1/1671
2022/0361208 A1* 11/2022 Khoshnevisan ...... H04W 72/02
2022/0369307 A1* 11/2022 Ren ....................... H04W 72/51
2022/0386291 A1* 12/2022 Xu ........................ H04W 72/56
2022/0386362 A1* 12/2022 Sun ....................... H04W 72/23
2023/0023719 A1* 1/2023 Ji .......................... H04W 72/21
2023/0074723 A1* 3/2023 Alfarhan ............... H04L 1/1614
2023/0087223 A1* 3/2023 Jang ...................... H04L 5/0035 370/329
2023/0093477 A1* 3/2023 El Hamss ............. H04L 1/1861 370/329
2023/0112147 A1* 4/2023 Chien ................... H04L 1/1858 370/329
2023/0155720 A1* 5/2023 Yin ....................... H04L 1/0013 370/329
2023/0171038 A1* 6/2023 Yang ..................... H04L 5/0055 370/329
2023/0189273 A1* 6/2023 Fu ......................... H04L 5/0044 370/329
2023/0198682 A1* 6/2023 Khoshnevisan ...... H04W 72/21 370/329
2023/0209509 A1* 6/2023 Khoshnevisan ...... H04L 5/0053 370/329
2023/0232380 A1* 7/2023 Bhamri ..................... H04L 1/08 370/329
2023/0262711 A1* 8/2023 Jia ......................... H04W 72/21 370/329
2023/0309101 A1* 9/2023 Bhatoolaul ........... H04L 1/1848
2023/0370209 A1* 11/2023 Wang .................... H04L 1/1854
2024/0008035 A1* 1/2024 Dai ....................... H04L 1/1812
2024/0023081 A1* 1/2024 Kumagai .............. H04L 5/0055
2024/0048288 A1* 2/2024 Fakoorian ............ H04W 72/56
2024/0056231 A1* 2/2024 Yin ....................... H04L 1/1854
2024/0072975 A1* 2/2024 Rastegardoost ...... H04W 72/20
2024/0129093 A1* 4/2024 Baldemair ............ H04L 5/0053
2024/0155618 A1* 5/2024 Yuan ..................... H04L 1/1861
2024/0155667 A1* 5/2024 Jung ..................... H04W 72/21
2024/0171326 A1* 5/2024 Tooher .................... H04L 1/189
2024/0187160 A1* 6/2024 El Hamss ............. H04W 72/23
2024/0365243 A1* 10/2024 Ding ................... H04W 52/146
2024/0365312 A1* 10/2024 Lin ....................... H04L 5/0064
2024/0381359 A1* 11/2024 Chien ................... H04L 1/1854
2024/0388387 A1* 11/2024 Shariatmadari ... H04W 72/0446
2025/0142402 A1* 5/2025 Fu ..................... H04W 28/0263
2025/0151056 A1* 5/2025 Kim ...................... H04L 1/1671
2025/0233685 A1* 7/2025 Ruan ......................... H04L 1/06
2025/0344244 A1* 11/2025 Singh ................ H04W 74/0808

OTHER PUBLICATIONS

U.S. Appl. No. 63/034,881 (Year: 2020).*
3GPP TR 38.913 V16.0.0, "3rd Generation Partnership Project; Technical Specification Group Radio Access Network; Study on Scenarios and Requirements for Next Generation Access Technologies; (Release 16)," Jul. 2020, 40 pages.
3GPP TS 23.501 V16.1.0, 3rd Generation Partnership Project; Technical Specification Group Services and System Aspects; System Architecture for the 5G System; Stage 2 (Release 16), Jun. 2019, 368 pages.
3GPP TS 38.211 V15.7.0, 3rd Generation Partnership Project; Technical Specification Group Radio Access Network; NR; Physical channels and modulation (Release 15), Sep. 2019, 97 pages.
3GPP TS 38.211 V16.2.0, 3rd Generation Partnership Project; Technical Specification Group Radio Access Network; NR; Physical channels and modulation (Release 16), Jun. 2020, 131 pages.
3GPP TS 38.212 V15.6.0, 3rd Generation Partnership Project; Technical Specification Group Radio Access Network; NR; Multiplexing and channel coding (Release 15), Jun. 2019, 101 pages.
3GPP TS 38.300 V15.6.0, 3rd Generation Partnership Project; Technical Specification Group Radio Access Network; NR; NR and NG-RAN Overall Description; Stage 2 (Release 15), Jun. 2019, 99 pages.

(56) References Cited

OTHER PUBLICATIONS

Extended European Search Report, mailed Dec. 1, 2021, for the corresponding European Patent Application No. 21177810.5, 10 pages.
International Search Report, mailed Sep. 1, 2022, for the corresponding International Patent Application No. PCT/EP2022/064518, 4 pages.
International Telecommunication Union, "IMT Vision—Framework and overall objectives of the future development of IMT for 2020 and beyond," Recommendation ITU-R M.2083-0, Sep. 2015, 21 pages.
Xiaomi, "HARQ-ACK feedback enhancement for URLLC/IIoT," R1-2007900, Agenda Item: 8.3.1.1, 3GPP TSG RAN WG1 #103, e-Meeting, Oct. 26-Nov. 13, 2020, 3 pages.
Huawei, China Southern Power Grid, BUPT, HiSilicon, "UE feedback enhancements for HARQ-ACK," R1-2102351, Agenda Item: 8.3.1.1, 3GPP TSG RAN WG1 Meeting #104bis-e, E-meeting, Apr. 12-20, 2021. (9 pages).
Office Action, dated Jul. 29, 2026, for Chinese Patent Application No. 202280039582.7. (25 pages)(with English Translation).

* cited by examiner

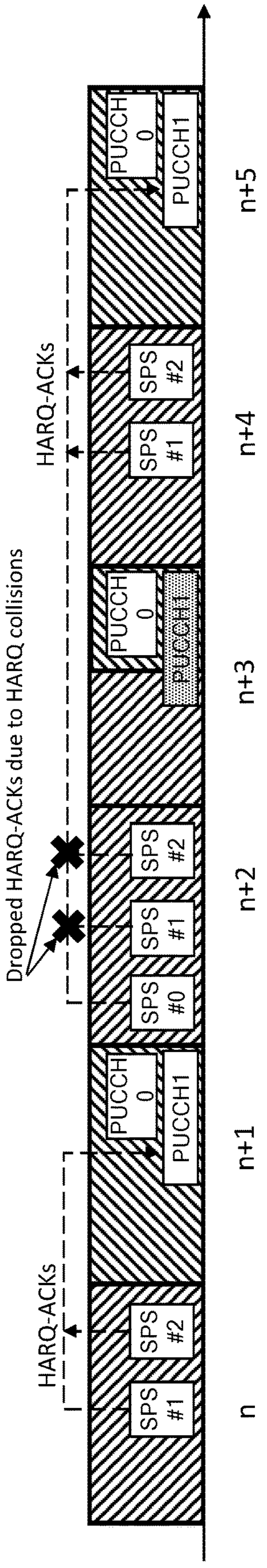
Fig. 9a
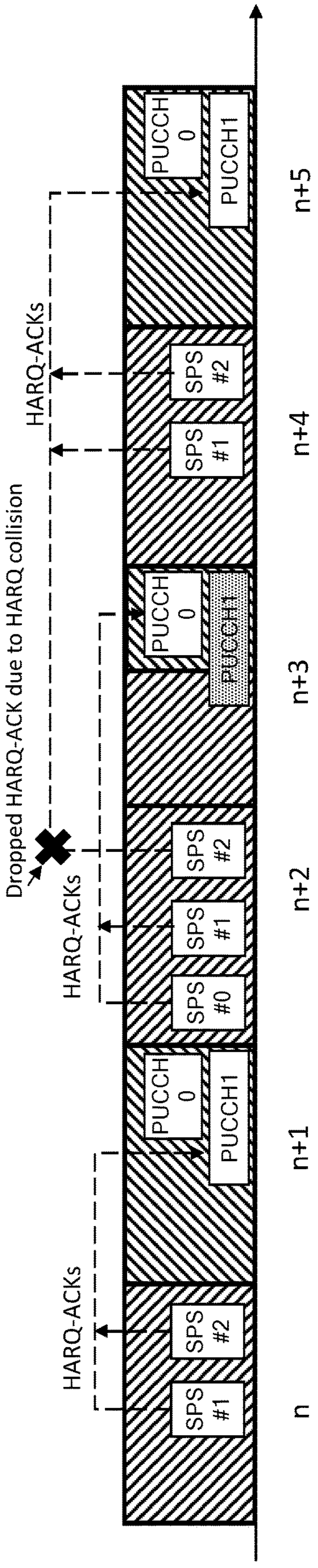
Fig. 9b
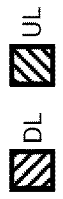

USER EQUIPMENT, SCHEDULING NODE, METHOD FOR USER EQUIPMENT, AND METHOD FOR SCHEDULING NODE TO DETERMINE WHETHER OR NOT TO USE A TRANSMISSION OPPORTUNITY FOR TRANSMITTING THE AVAILABLE UCI

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE and NR, further improvements and options may facilitating efficient operation of the communication system as well as particular devices pertaining to the system.

BRIEF SUMMARY

One non-limiting and exemplary embodiment facilitates efficient usage of transmission opportunities for transmission of Uplink Control Information (UCI).

In an embodiment, the techniques disclosed here feature an apparatus (e.g., a user equipment, UE). The apparatus comprises circuitry which, in operation, obtains an indication indicating a plurality of transmission opportunities for transmission of UCI. The circuitry determines that UCI is available for transmission and, based on priority criteria associated with the available UCI, whether or not to use a transmission opportunity among the plurality of transmission opportunities for transmitting the available UCI. Furthermore, the apparatus comprises a transceiver which, in operation, uses the transmission opportunity for transmitting the available UCI if it is determined that the transmission opportunity is to be used for transmitting the available UCI.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 9*a* is a schematic drawing illustrating first exemplary UE behavior in case of a collision of a transmission opportunity with a DL symbol;

FIG. 9*b* is a schematic drawing illustrating second exemplary UE behavior in case of a collision of a transmission opportunity with a DL symbol;

DETAILED DESCRIPTION

5G NR System Architecture and Protocol Stacks

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
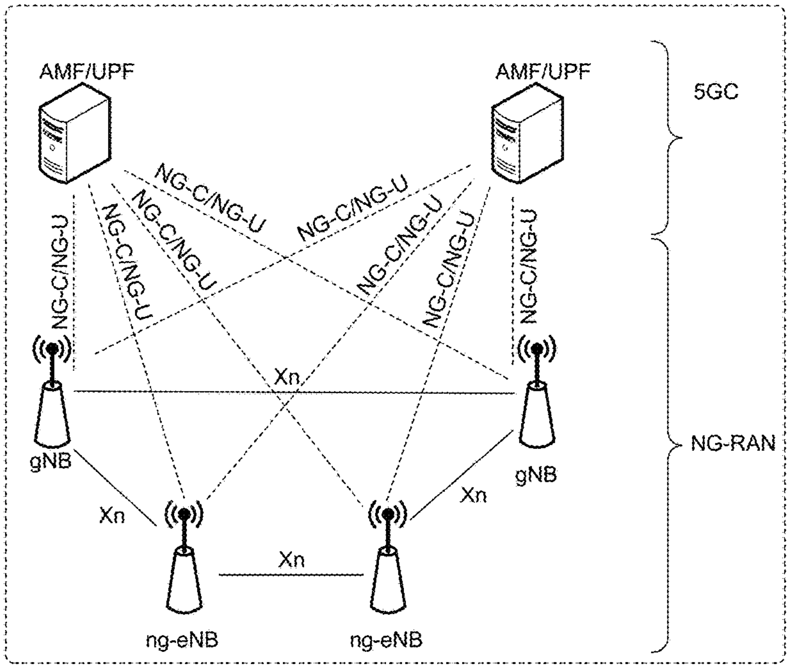
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (sec, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC may preferably require high connection density (1,000,000 devices/$km^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v16.2.0, e.g., section 4). For instance, downlink and uplink transmissions are organized into frames with 10 ms duration, each frame consisting of ten subframes of respectively 1 ms duration. In 5g NR implementations the number of consecutive OFDM symbols per subframe depends on the subcarrier-spacing configuration. For example, for a 15-kHz subcarrier spacing, a subframe has 14 OFDM symbols (similar to an LTE-conformant implementation, assuming a normal cyclic prefix). On the other hand, for a 30-kHz subcarrier spacing, a subframe has two slots, each slot comprising 14 OFDM symbols.

Comparing to LTE numerology (subcarrier spacing and symbol length), NR supports multiple different types of subcarrier spacing, labeled by a parameter $\mu$ (in LTE there is only a 15 kHz subcarrier spacing, corresponding to $\mu=0$ in NR). The types NR numerology is summarized in 3GPP TS 38.211, v 15.7.0.

5G NR Functional Split Between NG-RAN and 5GC

Figure 2:
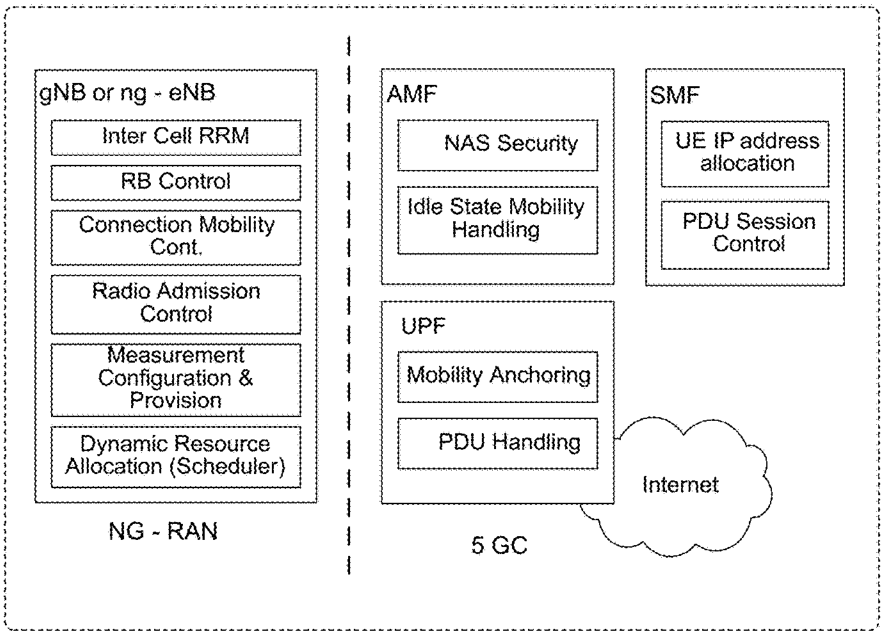
FIG. 2 is a schematic drawing that shows a functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;

- Support of UEs in RRC_INACTIVE state;
- Distribution function for NAS messages;
- Radio access network sharing;
- Dual Connectivity;
- Tight interworking between NR and E-UTRA.

The Access and Mobility Management Function (AMF) hosts the following main functions:

- Non-Access Stratum, NAS, signalling termination;
- NAS signalling security;
- Access Stratum, AS, Security control;
- Inter Core Network, CN, node signalling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:

- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g., packet filtering, gating, UL/DL rate enforcement;
- Uplink Traffic verification (SDF to QoS flow mapping);
- Downlink packet buffering and downlink data notification triggering.

Finally, the Session Management function, SMF, hosts the following main functions:

- Session Management;
- UE IP address allocation and management;
- Selection and control of UP function;
- Configures traffic steering at User Plane Function, UPF, to route traffic to proper destination;
- Control part of policy enforcement and QoS;
- Downlink Data Notification.

RRC Connection Setup and Reconfiguration Procedures

Figure 3:
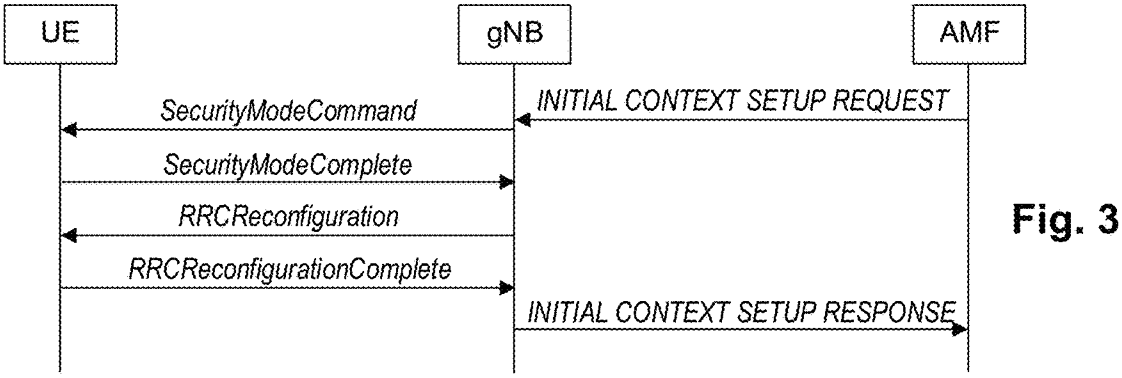
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
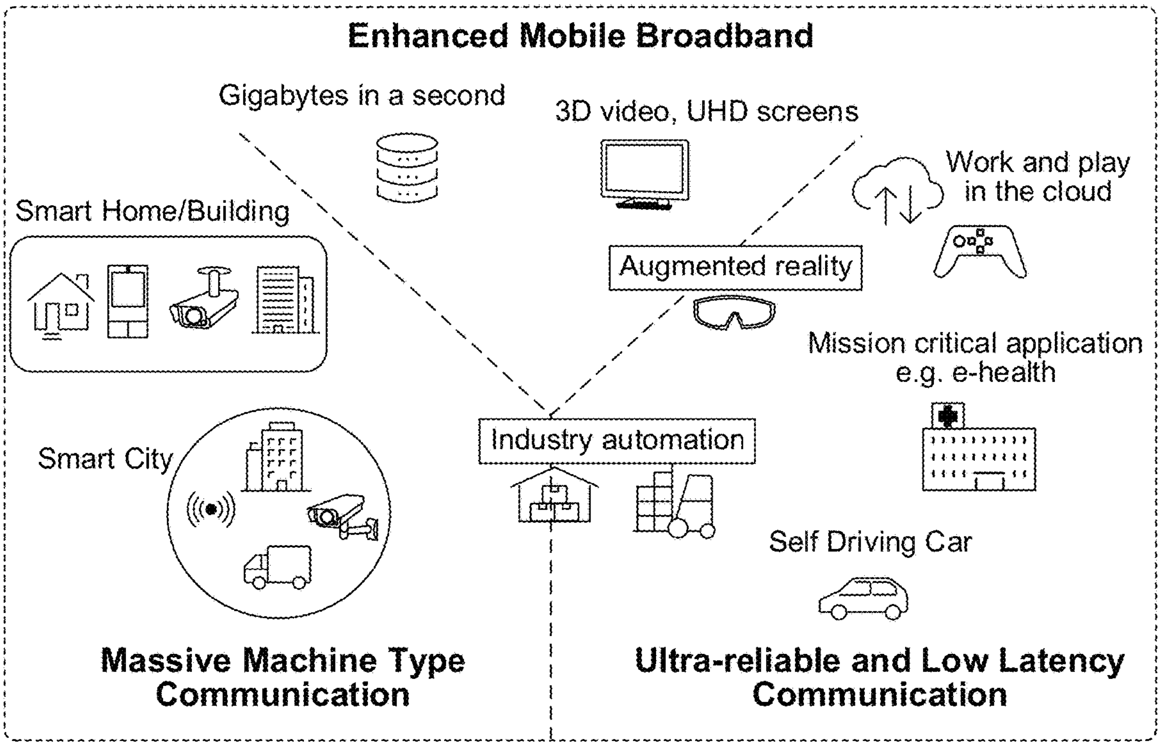
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., ITU-R M.2083 Fig. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few us where the value can be one or a few us depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
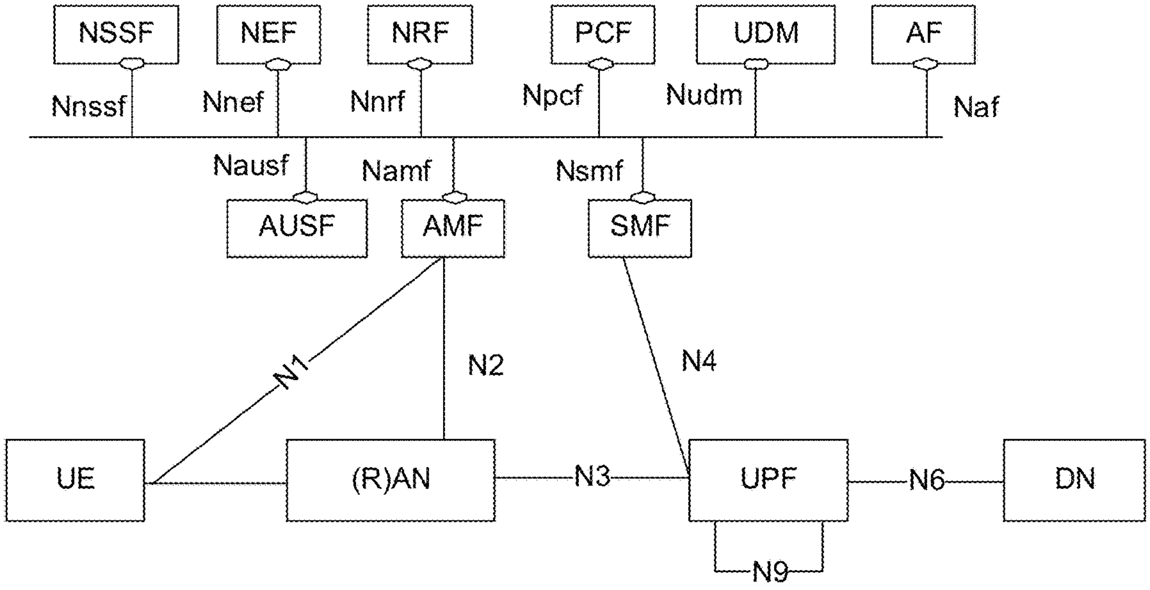
FIG. 5 is a block diagram showing an exemplary 5G system architecture for a non-roaming.

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

Control Signals

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

Terminal

A terminal or user terminal or user device or mobile station or mobile node is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay. For instance, a terminal is a physical entity (physical node) within a communication network. Still further, the communication device may be any machine-type communication device, such as IoT device or the like. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

Base Station

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well. A base station may be a scheduling node or network node, e.g., forming a part of the network for providing services to terminals. In particular, a base station may provide wireless access to terminals. Communication between the terminal and the base station is typically standardized and may be defined by different layers, such as PHY, MAC, RRC, etc. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions. The terminology used in LTE is eNB (or eNodeB), while the currently used terminology for 5G NR is gNB. The term base station or radio base station here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Uplink/Downlink/Sidelink

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

Data Channels/Control Channels

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

Reference Signals

In the present disclosure, the reference signals are signals known to both a base station and a mobile station and each reference signal may be referred to as a Reference Signal (RS) or sometimes a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

Time Intervals

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

Frequency Bands

The present disclosure may be applied to any of a licensed band and an unlicensed band.

Communication

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

Antenna Ports

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

Downlink Control Channel Monitoring, PDCCH, DCI

Many of the functions operated by the UE involve the monitoring of a downlink control channel (e.g., the PDCCH, see 3GPP TS 38.300 v15.6.0, section 5.2.3) to receive, e.g., particular control information or data destined to the UE.

A non-exhaustive list of these functions is given in the following:

- a paging message monitoring function,
- a system information acquisition function,
- signalling monitoring operation for a Discontinued Reception, DRX, function,
- inactivity monitoring operation for a Discontinued Reception, DRX, function,
- random access response reception for a random access function,
- reordering function of a Packet Data Convergence Protocol, PDCP, layer.

As mentioned above, the PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v15.6.0 section 7.3.1).

Said DCI formats represent predetermined formats in which respective information is formed and transmitted. In particular, DCI formats 0_1 and 1_1 are used for scheduling PUSCH and PDSCH, respectively, in one cell.

The PDCCH monitoring of each of these functions serves a particular purpose and is thus started to said end. The PDCCH monitoring is typically controlled at least based on a timer, operated by the UE. The timer has the purpose of controlling the PDCCH monitoring, e.g., limiting the maximum amount of time that the UE is to monitor the PDCCH. For instance, the UE may not need to indefinitely monitor the PDCCH, but may stop the monitoring after some time so as to be able to save power.

As mentioned above, one of the purposes of DCI on the PDCCH is the dynamic scheduling of resources in downlink or uplink or even sidelink. In particular, some formats of DCI are provided to carry indication of resources (resource allocation, RA) allocated to a data channel for a particular user. The resource allocation may include specification of resources in frequency domain and/or time domain.

Physical Resource Block

In general, the term "physical resource block" (PRB) refers to the smallest allocable resource unit usable for (user) data transmission. In LTE and NR, a PRB has a predetermined number (e.g., 12) of consecutive subcarriers in frequency domain and a predetermined number of symbols in time domain (e.g., 14 OFDM symbols in LTE).

Terminology

In the following, UEs, base stations, and procedures will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

EMBODIMENTS

The present disclosure provides techniques for efficient Uplink Control Information (UCI) transmissions based on priority criteria. In particular, the present disclosure may avoid collision of HARQ processes having a same HARQ process ID, facilitate transmission of UCI taking into account QoS requirements of traffic, may all allow reducing UL control resource usage as well as the power consumption, and may facilitate achieving different reliabilities depending on UCI content.

Figure 6:
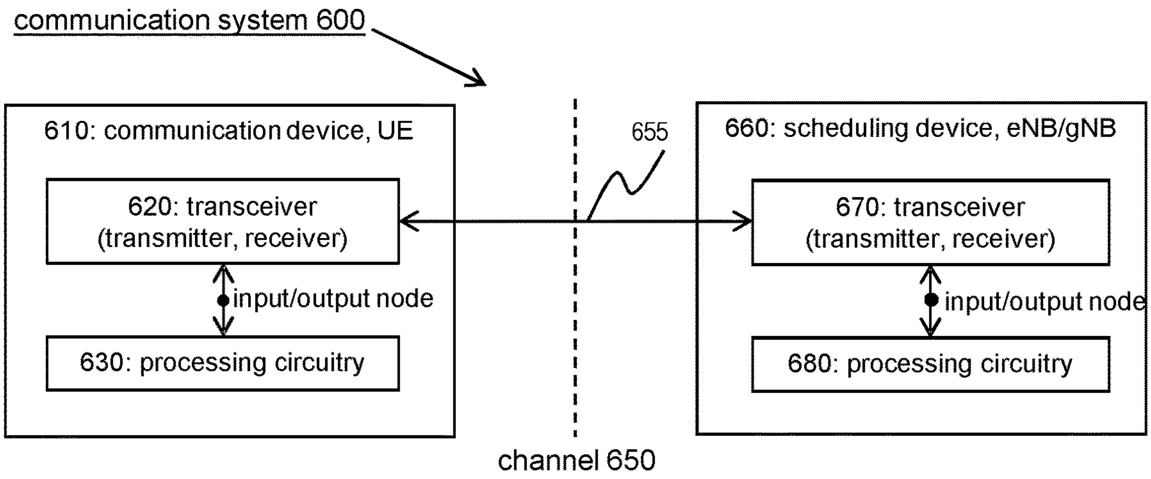
FIG. 6 is a block diagram of a communication system including a user equipment and a base station with their respective structure.

Since the present disclosure relates to UCI, both entities, a scheduled device (typically communication device/transceiver device/UE) and scheduling device (typically network node) take part. Accordingly, the present disclosure provides a base station and a user equipment. As illustrated in FIG. 6, user equipment 610 and base station 660 may communicate with each other over a wireless channel 650 in a wireless communication system. For instance, the user equipment may be a NR user equipment, and the base station may be a network node or scheduling node such as a NR gNB, in particular a gNB in a Terrestrial Network (TN) or Non-Terrestrial Network (NTN) NR system. Accordingly, the details and embodiments apply to each of the UE, the scheduling device (or scheduling nodes), and the methods for the UE and the scheduling device unless explicit statement or context indicates otherwise. In particular, when, in the present disclosure, the UE performs a determination using a particular method (e.g., based on specific priority criteria), the base station, having received UCI, may determine the type of the UCI using a method that corresponds to said particular method (e.g., based on the same or similar specific priority criteria).

The present disclosure further provides a system including a scheduled and scheduling device, as well as a corresponding methods and programs. An example of such communication system is illustrated in FIG. 6. The communication system 600 may be a wireless communication system in accordance with the technical specifications of 5G, in particular a NR communication system. However, the present disclosure is not limited to 3GPP NR and may also be applied to other wireless or cellular systems such as NTNs.

FIG. 6 illustrates a general, simplified and exemplary block diagram of a user equipment 610 (also termed communication device) and a scheduling device 660 which is here exemplarily assumed to be located in the base station (network node), e.g., the eNB or gNB. However, in general, a scheduling device may also be a terminal in case of a sidelink connection between two terminals. Moreover, in particular with respect to the use cases of URLLC; eMBB, and mMTC, the communication device 610 may also be a sensor device, a wearable device, or a connected vehicle, or a controller of an automated machine in an industrial factory. Further, a communication device 610 may be able to function as a relay between base station 660 and another communication device (e.g., the disclosure is not limited to communication "terminals" or user "terminals").

The UE and eNB/gNB are communicating with each other over a (wireless) physical channel 650 respectively using their transceivers 620 (UE side) and 670 (base station side). Together, the base station 660 and the terminal 610 form the communication system 600. The communication system 600 may further include other entities such as those shown in FIG. 1.

As shown in FIG. 6, in some embodiments, the user equipment (UE) 610 comprises a transceiver 620 and a circuitry 630. The circuitry 630, in operation, (i) obtains an indication indicating a plurality of transmission opportunities for transmission of UCI, (ii) determines that UCI is available for transmission, and (iii) determines, based on priority criteria associated with the available UCI, whether or not to use a transmission opportunity among the plurality of transmission opportunities for transmitting the available UCI. The transceiver 620, in operation, uses the transmission opportunity for transmitting the available UCI if it is determined that the transmission opportunity is to be used for transmitting the available UCI.

In general, the available UCI may include a plurality of pieces of UCI. A piece of UCI may, for instance, be a HARQ report, a Channel Quality Indictor (CQI), or a scheduling request (SR). Furthermore, it is noted that the term available UCI refers to UCI that has arrived, e.g., from a higher layer and is available/ready for transmission.

Figure 7A:
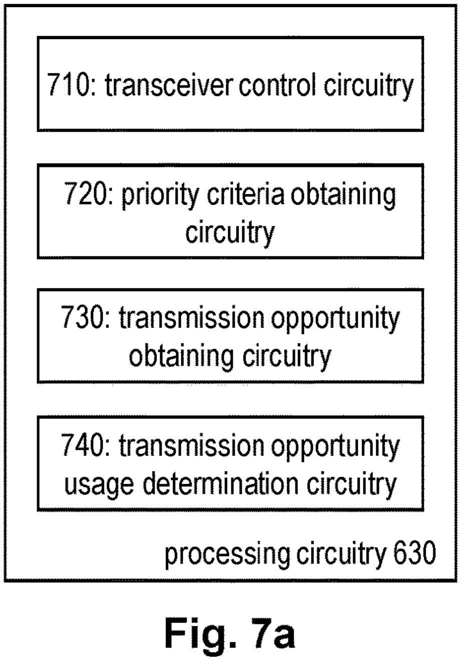
FIG. 7A is a block diagram illustrating functional structure of the processing circuitry at the user equipment side.

FIG. 7A shows a functional structure of the circuitry 630. In particular, it includes a transceiver control circuitry 710. The transceiver control circuitry 710, in operation, controls the transceiver. For example, the control may include controlling the transceiver 620 to transmit UCI, to receive signalling including an indication indicating the priority criteria, to receive signalling including an indication indicating transmission opportunities, and/or to receive DL traffic. For example, the transceiver control circuitry 710 controls the transceiver 620 to decode such signalling. Furthermore, circuitry 630 may include priority criteria obtaining circuitry 720, transmission opportunity obtaining circuitry 730, and/or transmission opportunity usage determination circuitry 740. The priority criteria obtaining circuitry 720 may obtain indication(s) indicating priority criteria and/or obtain the priority criteria, e.g., by extracting (or parsing) it from a signalling or indication(s) received by the transceiver 620. The transmission opportunity obtaining circuitry 730 may obtain the indication(s) indicating transmission opportunities and/or obtain the transmission opportunities, e.g., by extracting (or parsing) it from a signalling or indication(s) received by the transceiver 620. The transmission opportunity usage determination circuitry 740 may determine whether UCI(s) are available for transmission and, if UCI(s) are available for transmission may determine: (i) whether to use a transmission opportunity to use for transmitting said available UCI(s), (ii) which transmission opportunities to use for transmitting said available UCI(s), and/or (iii) which UCI(s) of the available UCI(s) are to be transmitted with a transmission opportunity that is to be used for transmission (in particular, in case the payload size of transmission opportunities is too small to transmit all the available UCI(s)).

It is noted that the circuitry 630 may be a general processing circuitry including one or more processors which may execute code instructions stored in a memory (which may be also part of the circuitry) and which may include portions of the code instructions corresponding to the functionality described above with reference to respective circuitry 710-740. However, the present disclosure is not limited to any particular circuitry and embodiments of the disclosure may include dedicated or programmable hardware or general purpose hardware or any combination thereof. In particular, circuitries 710-740 may be different circuitries or the same circuitry (hardware).

As also shown in FIG. 6, in some embodiments, the base station 660 (or scheduling device 660) comprises a circuitry 680 and a transceiver 670. The circuitry 680, in operation, (i) determines priority criteria based on which it is to be determined whether or not to use a transmission opportunity among a plurality of transmission opportunities for transmitting available UCI, (ii) generates a first signalling information including an indication indicating the priority criteria, (iii) determines a plurality of transmission opportunities for transmission of UCI, and (iv) generates a second signalling information including an indication indicating the plurality of transmission opportunities. The transceiver 670, in operation (i) transmits the first signalling information, and (ii) transmits the second signalling information.

However, the present disclosure is not limit thereto as, as in some embodiments (alternatively or in addition to the features of the base station described in the previous paragraph), the transceiver 670, in operation, i) transmits a signalling information including an indication indicating a plurality of transmission opportunities for transmission of UCI, and ii) receives, in one of the transmission opportunities, one or more pieces of UCI; and circuitry 680, in operation, i) generates the signalling information; and ii) determines, based on priority criteria associated with the UCI, for each of the one or more received pieces of UCI, a UCI type of the received piece of UCI.

Figure 7B:
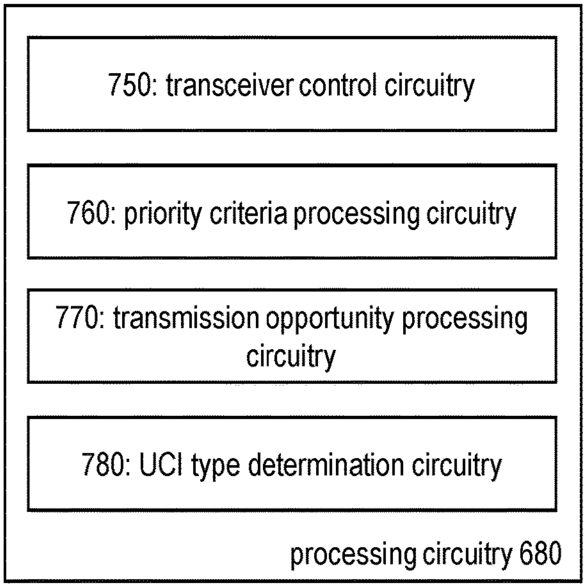
FIG. 7B is a block diagram illustrating functional structure of the processing circuitry at the base station side.

FIG. 7B shows a functional structure of the circuitry 680. In particular, it includes a transceiver control circuitry 750. The transceiver control circuitry 750, in operation, controls the transceiver. For example, the control may include controlling the transceiver 670 to receive UCI, transmit signalling including an indication indicating the priority criteria, to transmit signalling including an indication indicating transmission opportunities, and/or to transmit DL traffic. Furthermore, circuitry 680 may include priority criteria processing circuitry 760, transmission opportunity processing circuitry 770, and/or UCI type determination circuitry 780. The priority criteria processing circuitry 760 may determine priority criteria and generate and generate an indication (or a signalling including such indication) that indicates the determined priority criteria. The transmission opportunity processing circuitry 770 may determine transmission opportunities and generate an indication (or a signalling including such indication) that indicates the determined transmission opportunities. The UCI type determination circuitry 780 may determine the type of received UCI.

The communication device 610 may comprise the transceiver 620 and a (processing) circuitry 630, and the scheduling device 660 may comprise the transceiver 670 and a (processing) circuitry 680. The transceiver 610 in turn may comprise and/or function as a receiver and/or a transmitter. In this disclosure, in other words, the term "transceiver" is used for hardware and software components that allow the communication device 610, or, respectively base station 660 to transmit and/or receive radio signals over a wireless channel 650. Accordingly, a transceiver corresponds to a receiver, a transmitter, or a combination of receiver and transmitter. Typically, a base station and a communication device are assumed to be capable of transmitting as well as receiving radio signals. However, particularly with respect to some applications of eMBB, mMTC and URLLC (smart home, smart city, industry automation, etc.), cases are conceivable in which a device, such as a sensor, only receives signals. Moreover, the term "circuitry" includes processing circuitry formed by one or more processors or processing units, etc.

The circuitries (or processing circuitries) may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data that is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto.

It is further noted that any of the steps/operations described below may be performed or controlled by the circuitry 630 (on the UE side) and/or the circuitry 680 (on the base station side).

Figure 8:
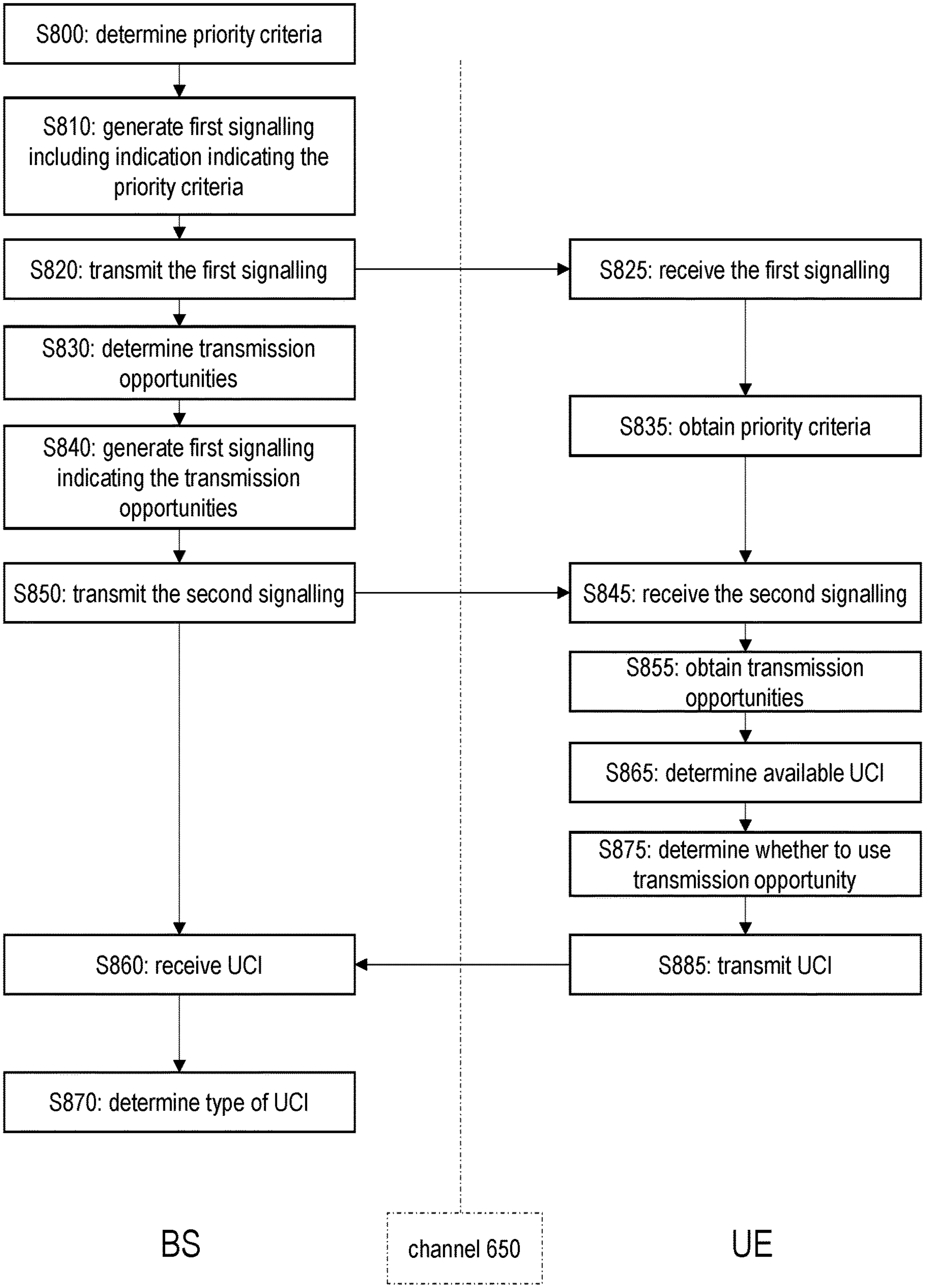
FIG. 8 is a flow chart illustrating exemplary steps performed by a network node as well as exemplary steps performed by a user equipment.

In correspondence with the above described UE, a method to be performed by/for a UE is provided. As illustrated in FIG. 8, the method includes the steps of (i) obtaining S855 an indication indicating a plurality of transmission opportunities for transmission of UCI; (ii) determining S865 that (or whether) UCI is available for transmission; (iii) determining S875 (if it is determined S865 that UCI is available), based on priority criteria associated with the available UCI, whether or not to use a transmission opportunity among the plurality of transmission opportunities for transmitting the available UCI; and, if it is determined that the transmission opportunity is to be used for transmitting the available UCI, using the transmission opportunity for transmitting (iv) S885 the available UCI. As also illustrated in FIG. 8, the method may also include a step of receiving S825 a signalling (or signalling information) including an indication indicating the priority criteria, a step of obtaining S835 the priority criteria (e.g., from said receiving S825 signalling), and/or a step of receiving S845 a signalling (or signalling information) including an indication indicating the plurality of transmission opportunities.

Furthermore, in correspondence with the above described base station, a method to be performed by/for a scheduling device is provided. As also illustrated in FIG. 8, the method includes the steps of (i) determining S800 priority criteria based on which it is to be determined whether or not to use a transmission opportunity among a plurality of transmission opportunities for transmitting available UCI; (ii) generating S810 a first signalling information including an indication indicating the priority criteria; (iii) transmitting S820 the first signalling information; (iv) determining S830 a plurality of transmission opportunities for transmission of UCI; (v) generating S840 a second signalling information including an indication indicating the plurality of transmission opportunities; and (vi) transmitting S850 the second signalling information.

However, the present disclosure is not limit thereto as, as in some embodiments (alternatively or in addition to the steps of the base station method described in the previous paragraph), a method to be performed by/for a scheduling device is provided, the method including the steps of (i) generating S840 a signalling information including an indication indicating a plurality of transmission opportunities for transmission of UCI; (ii) transmitting S850 the generated signalling information; (iii) receiving S860, in one of the transmission opportunities, one or more pieces of UCI; and (iv) determining S870, based on priority criteria associated with the UCI, for each of the one or more pieces of UCI, a UCI type of the piece of UCI.

It is noted that, in general, the priority criteria and the transmission opportunities may be determined separately or jointly, the first signaling and the second signaling may be generated separately or jointly, and/or the first signaling and second signaling may be sent separately or jointly. For instance, the base station may first, as illustrated ibn FIG. 8, send the priority signals and then assign UCI resources (for a plurality of transmissions). However, the present disclosure is neither limited to any particular order of these not that all these steps are necessarily performed. For instance, the priority criteria may be predefined in a standard and steps S800, S810, S820, S825, and S835 may not be performed.

Semi-Persistent Scheduling (SPS)

In general, the UE may be configured with one or more SPS configurations (in the present disclosure SPS configurations are also referred to as SPSs). An SPS configuration usually corresponds to a periodic set of DL resources configured by the base station for DL transmission. That is, the resources of an SPS configuration usually follow a certain periodicity in time domain in which there is a certain time interval between consecutive (continuous) resource allocations of the SPS.

The configured SPS correspond to respective DL SPS traffics and be associated with respective certain HARQ process IDs. That is, in general, each SPS may be associated with a respective HARQ process ID. The transmissions of an SPS (received in the resources of the SPS configuration) may here also be referred to as a DL traffic, and the individual transmissions of an SPS, transmitted in a single resource allocation of the SPS, as instances of said DL traffic.

3GPP has been working on enhancements for enhanced industrial Internet of things (IIoT) and ultra-reliable low-latency (URLLC) in Rel. 17. This includes improving the UE feedback, such as HARQ-ACK and CQI transmissions. Semi-persistent scheduling (SPS) can be exploit for deterministic URLLC traffic, such as time sensitive network (TSN), by reserving resources for downlink (DL) data transmissions and associated HARQ-ACK feedback in uplink (UL). The realization of SPS can be challenging in time division duplex (TDD), specially, when the reserved resources for HARQ-ACK report collide with DL/semi-static symbols. In such cases, the HARQ-ACK report should be dropped or deferred for later transmission. The HARQ-ACK dropping may reduce the communication reliability. While HARQ-ACK deferral may increase the latency and lead to the collision of HARQ processes.

DL Symbols Collision

In RAN1 #104b-e it has been agreed, for deferring dropped SPS HARQ-ACK bits in TDD, in case of a collision of a target UL slot/sub-slot with semi-static DL symbols, SSB and CORESET #0, that (all) the symbols in said target slot/sub-slot are regarded as "invalid" or as "no symbols for UL transmission."

Accordingly, in particular when the UE is operating in Time Division Duplex (TDD), it may be determined that a transmission opportunity that collides with one or more DL symbols that the transmission opportunity is not to be used for transmitting the (any) available UCI.

Furthermore, a limit on the maximum deferral of SPS HARQ in terms of k1def or k1+k1def is to be supported. The limitation may, e.g., be given by a maximum value of k1def or a maximum of k1deff=k1+k1def, and be determined, e.g., by K1 set(s) or an RRC configured limit. The limit on the maximum deferral of SPS HARQ may be defined in terms of k1eff=k1+k1def, and there may be no lower limit defined for k1def.

HARQ Process Collisions

In Rel-15 and Rel-16, HARQ-ACK feedback for SPS would be dropped when it collides with symbols that cannot be used for uplink transmission. Accordingly, in case the UE receives PDSCH of a certain HARQ Process ID, the deferred SPS HARQ bit(s) for this HARQ process ID may have to be dropped, and/or the initial HARQ-ACK transmission occasion may determine the out-of-order HARQ condition.

However, in unpaired spectrum, DL heavy configurations and multiple SPS configurations may cause HARQ-ACK being dropped frequently, which would waste resources and may have bad impact on the system performance. To avoid SPS HARQ-ACK dropping for TDD due to PUCCH collision with at least one DL or at least one flexible symbol not indicated to UL by SFI, HARQ reports may be postponed/deferred and/or how to multiplexed with other existing feedback information/UCI in a later slot/sub-slot.

Invalid symbols for UL transmission may be semi-static DL symbols, SSB and CORESET #0. The available PUCCH resource/symbol(s) may be located in uplink symbol(s), including semi-static configured uplink symbol(s) and the semi-static flexible symbol(s) indicated as uplink symbol(s) by dynamic SFI and/or dynamic DCI. However, a flexible symbol(s) may not be used unless it is changed to an uplink symbol by dynamic SFI and/or dynamic scheduling DCI.

The PUCCH resource of the first available PUCCH can be defined as the first PUCCH resource available in time after the instant of the deferred SPS PUCCH HARQ. Both PUCCH resources for SPS PDSCH only HARQ-ACK (PUCCH resources configured in SPS-PUCCH-AN-List-r16) and for dynamic PDSCH HARQ-ACK (PUCCH resources configured in PUCCH-ResourceSet) can be the first available PUCCH, depending on which one is the first to be available.

With shorter SPS periodicity, collision between SPS HARQ-ACK resource and semi-static UL/DL configuration might happen frequently especially for a DL heavy TDD frame structure. This may decrease the performance of DL SPS since many SPS PDSCHs need to be retransmitted.

Transmission Opportunities

In the present disclosure, the term transmission opportunities refers to UL resources for transmitting UCI. In general, the transmission opportunities may be determined by the base station and a corresponding indication may be sent to the UE. The UE may then obtain and/or determine, from said indication, e.g., from a DCI signalling received from a scheduling device over PUCCH or PUSCH, the transmission opportunities. However, the present disclosure is not limited thereto. In general, PUCCH resources may not be reserved in advance and, for instance, could be used according to the k1 values. In general, it is also possible that some transmission opportunities are configured by the base station and other transmission opportunities are determined dynamically based on k1/timing values.

Priority Criteria

In the present disclosure, the term priority criteria refers to any criteria the UE may use (if/when UCI is determined to be available) to determine (e.g., in step S875): (i) whether to use a transmission opportunity to use for transmitting said available UCI(s), (ii) which transmission opportunities to use for transmitting said available UCI(s), and/or (iii) which UCI(s) of the available UCI(s) are to be transmitted with a transmission opportunity that is to be used for transmission. In general, the UE may base this determination the priority criteria associated with the available UCI, but may also take into account priority criteria of other UCI. For instance, if UCI with a high priority is expected to be become available, the UE may defer transmission of already available UCI. Furthermore, when it is determined that a transmission opportunity is to be used for transmitting the UCI and is used for transmitting the UCI it is not meant that necessarily the entire UCI (i.e., all its pieces) is transmitted using said transmission opportunity. In some case only part of the UCI is transmitted using said transmission opportunity. Moreover, the term priority criteria also refers to any criteria the base station may use to determine the UCI type of a UCI. In particular, the priority criteria may include, for one, more than one, or each UCI type, (i) a priority value of the UCI type and/or (ii) timing information for said UCI type. Correspondingly, the priority/importance of a UCI may be specified may a priority value and/or a timing value The priority criteria can be defined to avoid HARQ process collisions, handle different traffic types, and limit the usage of uplink resources. The issues related HARQ process collisions are now explained in more detail with reference to FIGS. 9*a* and *b*.

In the examples shown in FIGS. 9*a* and 9*b*, the UE is configured with three SPS resources: SPS #0 with a periodicity of 4 slots, and SPS #1 and SPS #2 with a periodicity of 2 slots. In other words, the UE is configured with the three SPS configuration SPS #0 to #3, each SPS configuration specifying a resources that follow a respective periodicity. The UE is also configured with two PUCCH resources: PUCCH0 which can carry up to 2 bits, and PUCCH1 which can carry more than 2 bits.

After the UE has received transmission(s) in resources of an SPS configuration(s), the UE can send the corresponding HARQ reports(s) (or ACK/NACK reports) in the next following slots (e.g., in the slots following/after the slot in which it received said transmission). For instance, to carry HARQ report(s) related to traffic received in a certain slot, the UE may usually (in particular when there is no DL symbols collision) utilize the PUCCH1 in the slot following said certain slot. For instance, the UE receives SPS #1 and SPS #2 traffic in slot n, and transmits the corresponding HARQ reports in slot n+1. As further illustrated, in slot n+2, traffic in the resources of each of SPS #1 to SPS #3 is received. However, in slot n+3, the PUCCH1 collides with a DL symbol(s) in the first half of the slot. Accordingly, the entire PUCH1 in slot n+3 may be considered invalid for transmission of UCI.

As illustrated in FIG. 9*a*, since these 3 HARQ reports cannot be fit in PUCCH0 over slot n+2, the UE may defer the HARQ-ACKs for SPS #0 to #2 to be carried over PUCCH1 in slot n+5. However, in this case, there will be HARQ process collisions for SPS #1 and #2 as new PDSCHs for these arrive in slot n+4. Alternatively, as illustrated in FIG. 9*b*, part/some of the HARQ reports, e.g., for SPS #0 and #1 (selected chronologically) may be carried by PUCCH0 over slot n+3, and the HARQ report for SPS #2 is deferred to slot n+5. In this case, there will still be a collision of the HARQ process for SPS #2 as a new PDSCH arrives in slot n+4 before sending the previous HARQ report. Thus, in general, the UE may have to drop the deferred HARQ report bit of a HARQ process if it receives a new PDSCH with the same HARQ process ID.

As explained in more detail below, using priority criteria, the UE can determine the priorities associated to different UCI. This may be used to determine which UCI is to be carried earlier, especially when all available UCI cannot be carried at the same time.

With multiplexing, the UE can transmit different UCI types jointly, for instance, SR+CQI+HARQ-ACK. When the payload size of all the available UCI exceeds the payload size of the transmission opportunity, the UE may have to select a part of available UCI for transmission. So, this priority-based solution is can be applied to 1) different UCI types (for instance, SR+HARQ-ACK are selected) and 2) within each UCI type (for instance, 2 bits of total 3 HARQ-ACKs are selected).

For instance, the UE can determine the priorities for HARQ reports of different HARQ processes. The HARQ-report(s) with higher priorities may be carried/transmitted earlier. The HARQ reports with lower priorities might be deferred to be carried/transmitted later or dropped. When different UCI types are available for transmissions, the UE may choose to transmit a part of UCI, due to limited uplink control capacity, according to the defined priority criteria. This could be used for prioritization of UCI types for intra-UE multiplexing. The UE may also decide to defer/cancel UCI transmissions according to the defined priority criteria. Furthermore, the UE may behave differently according to the content of UCI and defined priority criteria. This enables carrying critical information earlier/more reliably, while transmitting less critical information with more relaxed latency/reliability. For instance, the NACK signal can be transmitted as early as possible, while the ACK signal can be transmitted with more relaxed latency. Another example is that the NACK signal could be transmitted more reliably compared to the ACK signal, using repetitions and/or different resources.

Accordingly, the base station may receive different UCI types, i.e., may receive one or more pieces of UCI each having a certain UCI type. Here, the term UCI type refers to the type of a UCI which includes, in particular, HARQ reports, CQIs, and/or SRs. The base station may determine which UCI types are transmitted, and/or how many bits for each UCI types are sent. More specifically, the base station may determine, for each received piece of UCI, the UCI type of said received piece of UCI. For HARQ reports the base station may also determine the associated process IDs.

In particular, having received one or more pieces of UCI, the base station may determine which pieces of UCI were available for transmission by/to a UE having transmitted said one or more pieces of UCI. For HARQ reports, the base station may know the HARQ reports the UE is about to transmit as the HARQ reports may refer to DL traffic transmitted by the base station to the UE. For instance, if the UE is configured to generate SR/CQI with some periodicities, the base station may also know at which instances the UE has SR/CQI for transmissions. Here available pieces of UCI thus refers to that pieces of UCI that have been available to the UE at the time of transmission, when determining which UCI are to be transmit, and/or whether use a transmission opportunity. The base station may then determine, for each of the one or more received pieces of UCI, the UCI type based on: (i) the priority criteria, (ii) the available pieces of UCI, and/or (iii) the resources in which said one or more pieces of UCI have been received (i.e., the transmission opportunity used/selected by the UE to transmit said pieces). At this, if a piece of UCI is a HARQ report, the base station may also determine a HARQ process ID of DL traffic that is associated with the HARQ report.

Signalling of Priority Criteria

In general, the priority criteria (based on which the UE is to perform, e.g., the determination S875) may be determined by the base station and signaled to the UE. The UE may select the UL resources for UCI transmissions according to the (currently) defined priority criteria. The defined priority criteria may defined/configured by the gNB, semi-statically or dynamically. The priorities could be adjusted by setting existing/new introduced parameters For instance the UE (e.g., transceiver 620), in operation, may receive an indication indicating the priority criteria: (i) as part of a Semi-Persistent Scheduling, (SPS) configuration, (ii) in a Radio Resource Control (RRC) signalling, (iii) in a Physical Downlink Shared Channel (PDSCH), (iv) in a Physical Downlink Control Channel (PDCCH), and/or (v) in a Downlink Control Information (DCI).

In particular, the priorities could be defined/configured semi-statistically through RRC and/or SPS configurations and be used to determine/set reliability/latency of the UCI content transmissions, which may reduce overhead. Sending an indication dynamically as a part of the PDSCH, PDCCH, or DCI may allow for a more flexible adjustment of priorities. The base station may configure the UE with the priorities (priority values) for different UCI types and/or may provide the sets of timing values for reporting HARQ reports as further explained below. The base station may also indicate the priority of each DL traffic separately.

As explained above, the priority criteria may be determined by the base station and signaled to the UE. However, the present disclosure is not limited thereto. Some or all of the priority criteria may also be determined by the UE (and signaled to the base station), and/or some or all priority criteria may be predefined (e.g., in a standard).

Priority Values as Priority Criteria

In general, the priority criteria may include, for each of the pieces of UCI, a respective priority. The priority of one (or multiple or each) of the pieces of the UCI may depend on: (i) the type of the said piece of UCI, (ii) the content of said piece of UCI, and/or (iii) an indication of the priority received by the transceiver.

Here, the term priority refers to a priority value which indicates the importance of a UCI (e.g., a higher value may correspond to higher importance). In other words, a UCI having a higher priority UCI may be selected rather than a UCI having a lower priority in case of limited UL resources.

In general, if it is determined that the transmission opportunity is to be used for transmitting the available UCI and a payload size of the available UCI is equal to or smaller than a payload size of the transmission opportunity, it may be determined that all the pieces of the available UCI are to be transmitted using said transmission opportunity. If, on the other hand, the payload size of the available UCI is larger than a payload size of the transmission opportunity, it may be determined, based on the priority criteria, which available pieces of UCI are to be transmitted using said transmission opportunity.

The UCI prioritization can be performed at different stages. For instance, the gNB can define additional priorities for UCI types, such as HARQ-ACK, scheduling request (SR), and CQI.

This can be done by defining priority indexes/values for UCI types, for instance, through RRC configuration. With the limited resources for UCI transmissions, the UE can decide which of available UCI types to be multiplexed and transmitted with the use of defined priorities for the UCI types and within each UCI type. For this purpose, the UE first may for instance apply the prioritization for the UCI types and then apply the prioritization within each UCI type.

Figure 13:
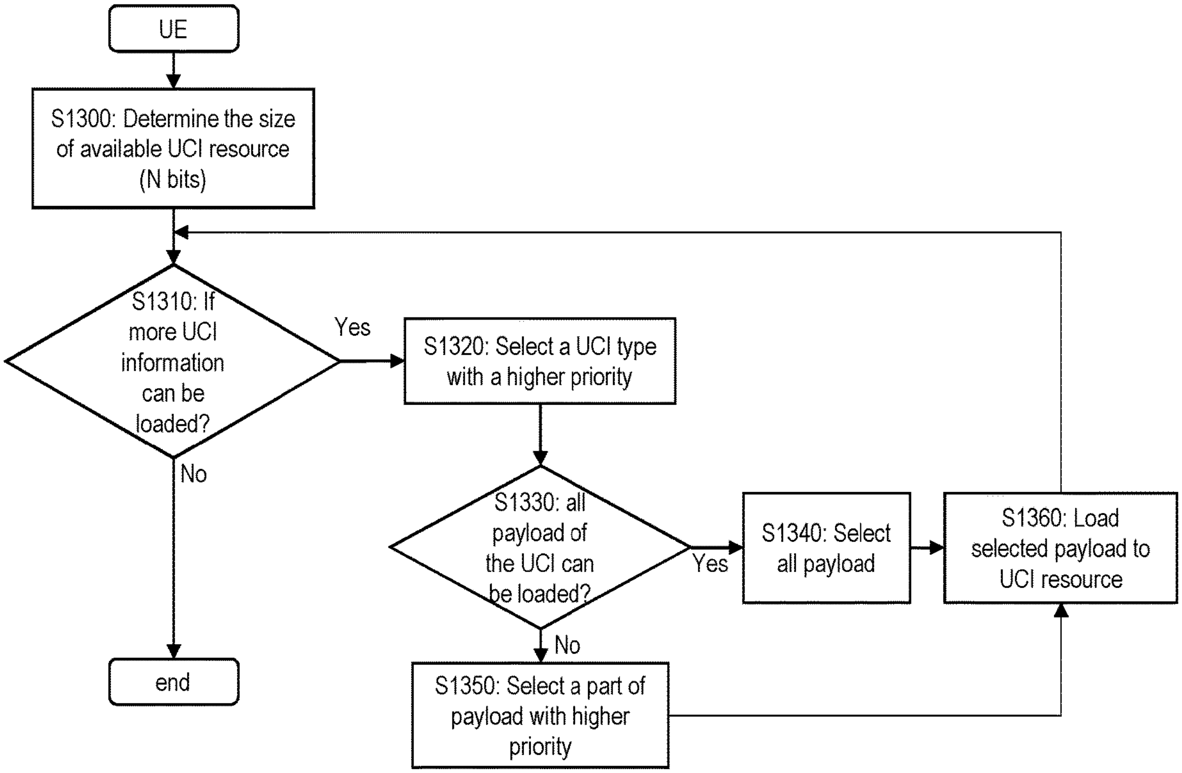
FIG. 13 is a flow chart illustrating exemplary steps performed by a UE when UCI becomes available for transmission.

A determination based on priority (values) is now explained in more detail with reference to FIG. 13. First, the UE may determine S1300 the size of an available UCI resource (N bits), which may be a transmission opportunity has been determined to be used for UCI transmission. As long as more UCI information can be loaded (Yes in S1310), the UE may determine/select S1320 an UCI type of available UCI having a highest priority among the available UCIs that have not yet been loaded. If all payload of the selected UCI type can be loaded (Yes in S1330), the UE may select S1340 all payload of the selected UCI type and load S1360 the selected payload to the UCI resource. If, on the other hand, not all payload of the selected UCI type can be loaded (No in S1330), the UE may select S1350 part of payload with a higher (or, at least, not lower) priority (value) than other parts of the selected UCI type, and load S1360 the selected payload to the UCI resource. In case all payload (pieces) of the selected UCI type have a same priority, the part of the UCI to be loaded may be determined according to other criteria (e.g., chronologically, in the same order the pieces of said UCI type became available).

In other words, summarizing the above, the UE may first select a UCI type with a highest priority and then, if the UCI resource can accommodate all the available payload of the selected UCI type, load the whole payload of the selected UCI type to the UCI resource. Otherwise, the UE may select a part of payload from the selected UCI type (e.g., based using a content-based priority).

To be more specific, let us assume that a PUCCH/PUSCH resource can accommodate up to 6-bit payload size, and that the UE has different pieces of available UCI having different UCI types that it intends to transmit, all together 11 bits of information as indicted in the table below:

| Priority index | UCI type | Payload size |
|---|---|---|
| 0 | SR for HP traffic | 1 |
| 1 | HARQ-ACK for HP traffic | 2 |
| 2 | CQI for HP traffic | 0 |

-continued

| Priority index | UCI type | Payload size |
|---|---|---|
| 3 | SR for LP traffic | 1 |
| 4 | HARQ-ACK for LP traffic | 3 |
| 5 | CQI for LP traffic | 4 |

In the table, the priority values of the different pieces of UCI are indicated in term of an index ranging from 0 to 5. That is SRs for HP traffic have a priority value of 0, HARQ-ACKs for HP traffic have apriority value of 1, and so forth. In other words, e.g., SRs for HP traffic may be considered to be a different type of UCI than SRs for LP traffic.

Using the priority (values) given by said table, the UE would down select the following UCI to be multiplexed and transmitted using a transmission opportunity as follows:

SR for HP traffic: 1 bit

HARQ-ACK for HP traffic: 2 bits

SR for LP traffic: 1 bits

HARQ-ACK for LP traffic: 2 bits from the whole 3 bits. The 2 bits are selected according to the HARQ-ACK priorities.

Other UCI types would be dropped/deferred.

This approach provides a simple and unified solution to select UCI types in different settings.

Priority of HARQ Reports

In general, the available UCI may comprise one or more HARQ reports. In other words, the some pieces of the available UCI may be HARQ reports. Furthermore, in general, each HARQ report is associated with DL traffic of a certain HARQ process ID, and the priority criteria may include, for each of the HARQ reports, a priority (value) of the HARQ report.

In the present disclosure, the term priority of a HARQ report in general refers to the priority associated with the HARQ process ID of said HARQ report, and the terms "priority of a HARQ report," "priority of a HARQ process ID" and the like are used interchangeably. In other words, the HARQ processes having a same HARQ process ID may have the same priority (e.g., until the base sends a signalling indicating a new priority for said HARQ process ID). That is, for each HARQ process ID, there may be a respective priority that is to be used by the HARQ reports of said HARQ process ID.

It is further noted that, in the present disclosure, the terms "HARQ report" is merely used as example for a retransmission requests or an indication that a specific transmission(s) have been received (e.g., completely received and successfully decoded) or not been received by the UE. In other words, the present disclosure also applies, in the same way, to ARQ report, other retransmission request, and/or reception/non-reception confirmation indications.

Figure 12:
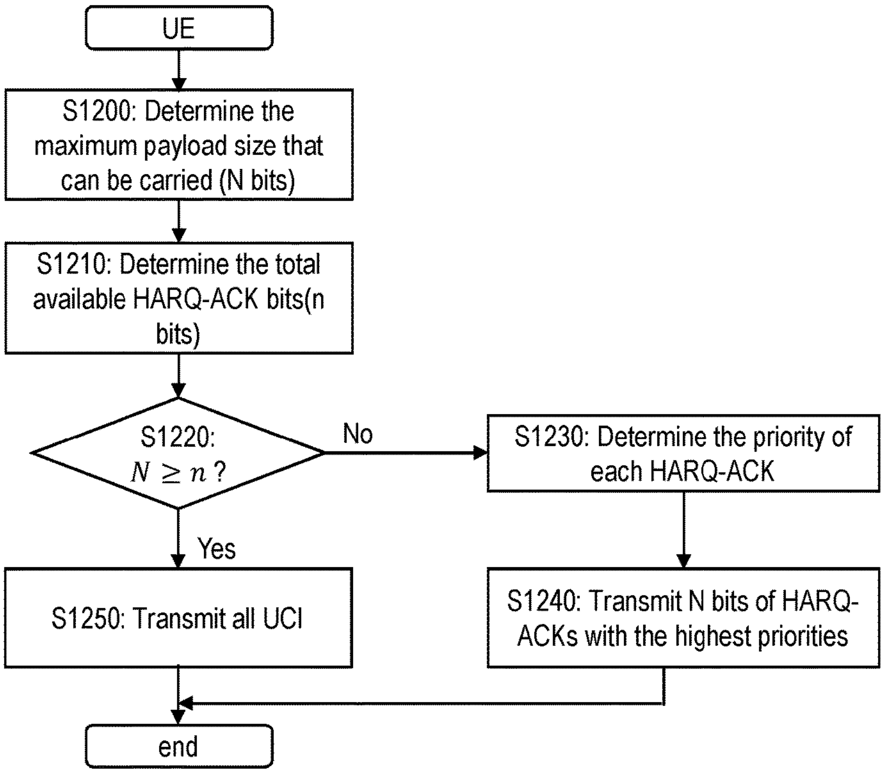
FIG. 12 is a flow chart illustrating exemplary steps performed by a UE when UCI becomes available for transmission.

FIG. 12 shows a flowchart for determining, based on the priorities of the HARQ reports, the HARQ-ACKs to be transmitted. Here it assumed that the UE has determined that there is UCI available for transmission and that a particular transmission opportunity is to be used for transmitting said available UCI. As, in FIG. 12, in the following description it is also assumed that all pieces of the available UCI are HARQ ACK/NACKs (e.g., HARQ reports). However, the same method may be used if some or all of the pieces are of another UCI type (e.g., CQIs and/or SRs).

In step S1200, the may UE determines the maximum payload size that can be carried by said transmissions opportunity, to be used for transmitting the available UCI.

More specifically, it is determined that N bits can be carried. In step S1210, the total number of HARQ-ACK bits is determined to be n bits. In step S1220, it is determined whether or not the determined payload size is larger than or equal to the number of ARQ-ACK bits, i.e., whether or not N≥n (N and/or n may integers greater than one). If the payload size is larger than or equal to the number of ARQ-ACK bits (yes in S1220), the transmission opportunity is used, in step S1250, to transmit all UCI.

If, on the other hand, the payload size is not larger than or equal to (in other words, smaller than) the number of ARQ-ACK bits (no in S1220), in step S1230, the priority of each available HARQ-ACK may be determined, and, in step S1240, N bits of the n HARQ-ACKs bits with the highest priorities among the priorities of the available HARQ-ACKs may be transmitted.

While the UE may determine which of available HARQ reports are to be transmitted, the base station may determine, if one or more of the received pieces of UCI are HARQ reports, the HARQ process ID of DL traffic that is associated with a received HARQ report. The base station may perform this determination jointly or separately with the determination of the UCI type (e.g., HARQ report/CQI/SR). The base station may base the determination of the HARQ process ID on similar or the same criteria as the UE as well as on which pieces of UCI it expects to be available for transmission at the UE side.

The following methods 1) to 4) for determining/setting the priorities of HARQ reports (or HARQ process IDs) may be combined. In other words, for instance, the priority HARQ reports of one or more HARQ process IDs may be based on the periodicity of the associated DL traffic, whereas the priority other HARQ reports of one or more other HARQ process IDs may be based on the priority of the associated traffic. It is also possible that the priority of HARQ reports of one or more HARQ process IDs is based/depends on a combination of one or more of the methods 1) to 4).

1) Periodicity-Based Priority of HARQ Reports, e.g., to Avoid HARQ Collisions

In general, the priority of a (e.g., of one HARQ report, of more than one HARQ report, or of all/each HARQ report) HARQ report may depend or be based on the periodicity of the DL traffic associated with said HARQ report. For instance, for each of the HARQ reports, the priority of a (or multiple or each) HARQ report may increase with increasing periodicity of said DL traffic associated with the HARQ.

Here the term periodicity refers, for instance, to a (occurrence) frequency of reception of said DL traffic, e.g., how frequently/often said DL traffic is received. Thus, in other words, the priority of a HARQ report may depend on a length of the time interval/period between successive instances of said DL traffic. For instance, as explained above, in FIGS. 9*a* and *b*, the periodicity of SPS #1, #2, and #3 is 4 slots, 2 slots, and 2 slots, respectively.

Here term instances of DL traffic refers to different DL transmissions (e.g., at different times) that have the same HARQ process ID and/or transmissions in different resources of a same SPS configuration. In other words, the periodicity of a DL traffic may be how frequently transmission of a particular HARQ process ID are received. Using a periodicity-based priority of HARQ reports may avoid collision of HARQ processes having the HARQ process ID.

2) Priorities Based on Expected Arrival Time of Next DL Traffic, e.g., to Avoid HARQ Collisions In general, the priority of a HARQ report (e.g., of one HARQ report, of more than one HARQ report, or of all/each HARQ report) may depend or be based on a length of a time period (e.g., from a current time) until a next instance of DL traffic having the same HARQ process ID as the certain HARQ process ID is expected to be received. For instance, the priority of a (or multiple or each) HARQ report may increase with decreasing length of the time period until the next instance of the DL traffic associated with said HARQ report is expected to be received. In other words, the length of the time period may be the length of the time interval between a current time and said next instance of the DL (e.g., in terms of slots).

Basing the Priority of HARQ reports on the expected arrival of next DL traffic may avoid collision of HARQ processes that have the HARQ process ID.

Avoidance of HARQ Collisions

Figure 10:
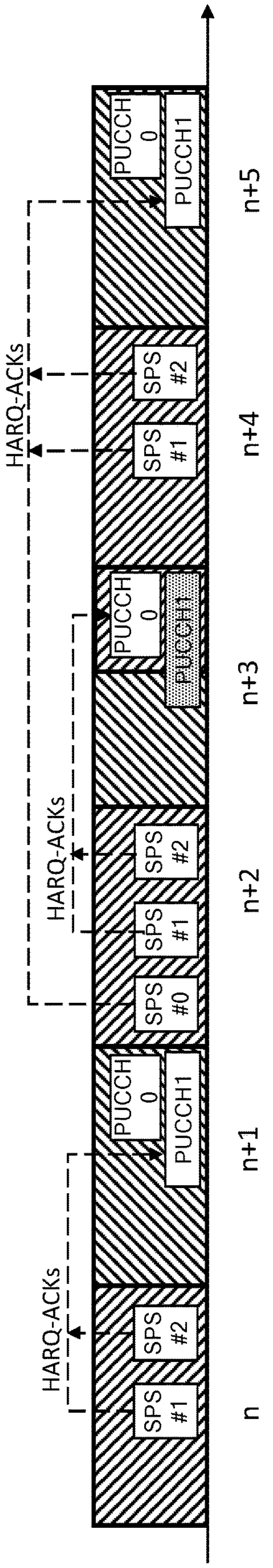
FIG. 10 is a schematic drawing illustrating exemplary priority-based UE behavior for avoiding HARQ report dropping in case of a collision of a transmission opportunity with a DL symbol.

As mentioned above, by using priorities, e.g., according to method 1), 2) or a combination thereof, collision of HARQ processes can be avoided. This is further explained with reference to FIG. 10, which shows a scenario in which the UE is configured with the same SPS configurations and UL transmission opportunities as the UE in FIGS. 9*a* and 9*b*, but is also configured to prioritize HARQ reports to avoid collision of HARQ processes.

More specifically, as in FIGS. 9*a* and 9*b*, there is a DL symbol collision of the PUCCH1 transmission opportunity in slot n+3. The UE decides to use the PUCCH0 transmission opportunity in slot n+3 for transmitting/to carry the HARQ reports for the PDSCHs (also referred to as DL traffics) associated with SPS #1 and #2 received in slot n+2. Furthermore, the UE determines to defer The HARQ-ACK for SPS #0 to be carried/transmitted in slot n+5, multiplexed with other HARQ-ACK bits.

For this purpose, the UE can determine the priorities of the available HARQ reports and then select those with higher priorities to be carried.

For instance, in accordance with method 1), the priority of the HARQ reports may be based on the periodicity of the associated PDSCH (or SPS or DL traffic). Accordingly, the UE may give a higher priority to HARQ reports that are associated with SPS traffic with higher periodicity than to HARQ reports that are associated with SPS traffic with a lower periodicity (lower than the higher periodicity). Thus, the HARQ reports with higher priorities (higher traffic periodicity) may be carried/transmitted earlier. In this example, SPS #1 and #2 have a periodicity of 2 slots, while SPS #0 has a periodicity of 4 slots. Hence, the HARQ reports associated with SPS #1 and SPS #2 would be selected/determined to be carried using PUCCH0 over slot n+3, whereas the HARQ report associated with SPS #0 would be selected to be carried using PUCCH1 over slot n+5.

Alternatively, for instance, in accordance with method 2), the priority of the HARQ reports may be based on the arrival time of the next PDSCH of the respective HARQ process ID. More specifically, for a given UCI transmission/HARQ report, the UE determines/estimates the arrival time of the next PDSCH traffic associated with the same HARQ process ID as said HARQ report. The HARQ report with a shorter arrival time of the next traffic may be given a higher priority than a HARQ report with a longer arrival time than the shorter arrival time. The UE then selects the HARQ report(s) with higher priorities to be transmitted. In this example, the UE is expected to receive the next PDSCHs for SPS #1 and #2 in slot n+4, and PDSCH for SPS #0 in slot n+6. Considering that PUCCH0 in slot n+3, the arrival times for new PDSCHs associated to SPS #0~2 may be determined to be 1, 1, and 3, respectively. The UE selects the HARQ reports associated with shorter arrival times, i.e., SPS #1 and #2.

As can be seen, using either of methods 1) or 2), the HARQ process collision of FIGS. 9*a* and 9*b* are avoided.

3) Content-Based Priority of HARQ Reports

In general, the priority of a HARQ report (e.g., of one HARQ report, of more than one HARQ report, or of all/each HARQ report) may depend or be based on whether the HARQ report is an acknowledgement (ACK) or a negative-acknowledgement (NACK). For instance, the priority of a (or multiple or each) HARQ report may be higher when the HARQ report is an NACK than when the HARQ report is an ACK.

In general (in particular also when the available UCI includes pieces of UCI that are not HARQ reports), the UE may be configured with different priorities for different contents of UCI. In other words, the priority of a piece of UCI may depend on the content and/or the type of the UCI. The priorities may be set to meet ACK/NACK transmissions with different latency requirements. For instance, the UE may be configured to report the NACK immediately, i.e., in the next slot, in order to trigger the data retransmission. On the other hand, the UE may be configured to transmit an ACK with a relaxed latency to enable HARQ-ACK multiplexing and reducing the UCI transmission.

Different priorities for ACK/NACK transmissions can be configured by defining separate timing values for HARQ reports that are ACKs than for HARQ report that are NACKs, e.g., one sequence of timing values for PDSCH-to-HARQ-NACK and another/different sequence of timing values for PDSCH-to-HARQ-ACK. For instance, for each HARQ process ID: (i) a first sequence of offset values (in the following referred to as ACK sequence) may be defined for the case that an ACK is to be transmitted, and (ii) a second sequence of offset values (in the following referred to as NACK sequence) may be defined for the case that an NACK is to be transmitted. In other words, the priority criteria may include, for each HARQ process ID: (i) a ACK sequence that is to be used for HARQ report of said ID that are ACKs, and (ii) a NACK sequence that is to be used for HARQ report of said ID that are NACKs. However, the present disclosure is not limited thereto. In general, there may be one ACK sequence that is to be used for multiple or all HARQ reports that are ACKs, and one NACK sequence that is to be used for multiple or all HARQ reports that are NACKs.

Figure 15:
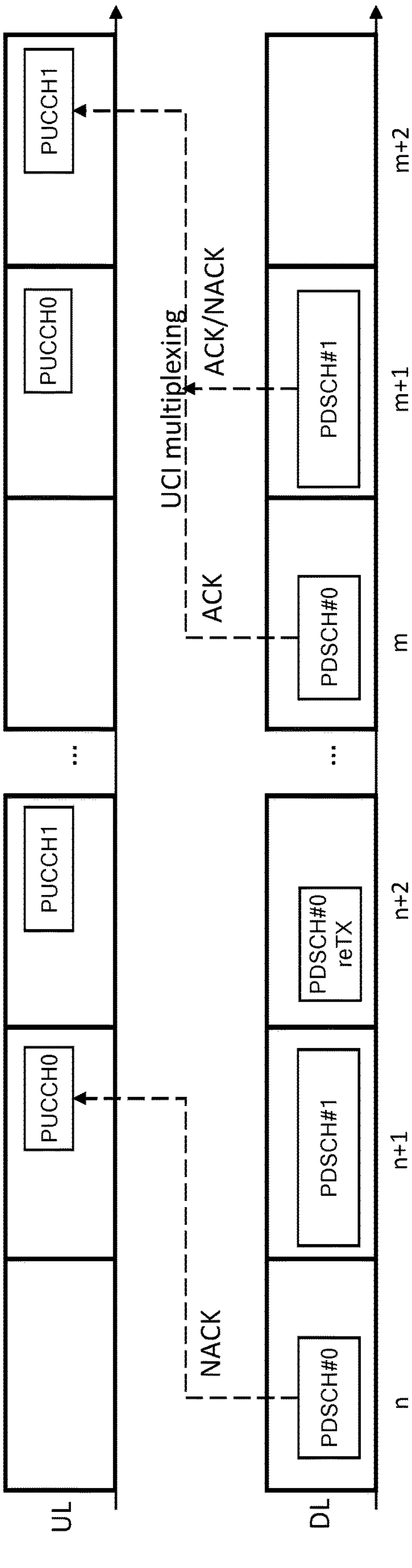
FIG. 15 is a schematic drawing illustrating exemplary priority-based UE behavior that enables reduction of UL traffic by deferral of less time-sensitive UCI by using different priority criteria for HARQ ACK and HARQ NACK.

This is now further explained with reference to FIG. 15, which illustrates a scenario in which the UE is operating in Frequency Division Duplex (FDD) mode, which refers to a mode in which there the UE is configured with (at least) two bands of frequency resources one of which is to be used for UL and the other for DL transmissions.

In the present example, the priority of NACKs of the process ID of PDSCH #0 is assumed to be higher than the priority of ACKs of the process ID of PDSCH #0. For instance, For PDSCH #0, NACKs may use the offset value of 1, whereas ACKs may use the offset value of 2. As illustrated in FIG. 15, the HARQ report related to the PDSCH #0 received in slot n is a NACK and, thus, transmitted using the PUCH0 in the next slot n+1. However, the HARQ report related to the PDSCH #0 received in slot m is an ACK and, thus, not transmitted in the PUCH0 in the next slot m+1.

Rather, the HARQ report related to the PDSCH #0 received in slot m is transmitted in the PUCH1 in the next slot m+2 together/multiplexed with the HARQ report related to PDSCH #1 received in slot m+1, which for instance may be have a content-independent offset value of 1. In particular, the UE may determine that the transmission opportunity(s) in slot n+1 are to be used for transmitting the UCI available at that time, determine that the transmission opportunity(s) in slot m+1 are not to be used for transmitting the UCI available at that time.

Using priorities that depend on the content of the UCI may enable deferral of less-time sensitive UCI content to be multiplexed, for reducing the power consumption and UL traffic. Furthermore, using content-based priorities may help reducing UE's power consumption as well as the interference in the communication system without deferring time-sensitive UCI.

4) Traffic-Based Priority of HARQ Reports

In general, the priority of a HARQ report (e.g., of one HARQ report, of more than one HARQ report, or of all/each HARQ report) may depend or be based on the priority of the DL traffic to which said HARQ report refers. For instance, the priority of a HARQ report may increase with increasing priority of the DL traffic associated with said HARQ report. In other words, the priority of a HARQ report (or multiple or each HARQ reports) may increase with the priority of (i) the DL transmission for which it reports an ACK or NACK and/or (ii) a priority of a HARQ process ID of the DL traffic/transmission for which it reports an ACK or NACK.

In other words, the UE may be configured with different traffic priorities, e.g., a high priority (HP) and a low priority (LP), and/or to carry HARQ reports based on the priority of downlink traffics. HP traffic may have more stringent reliability/latency requirements, compared to LP traffic. Hence, the HARQ-ACK for HP should be transmitted earlier/more reliability compared to HARQ reports for LP traffic.

Figure 11:
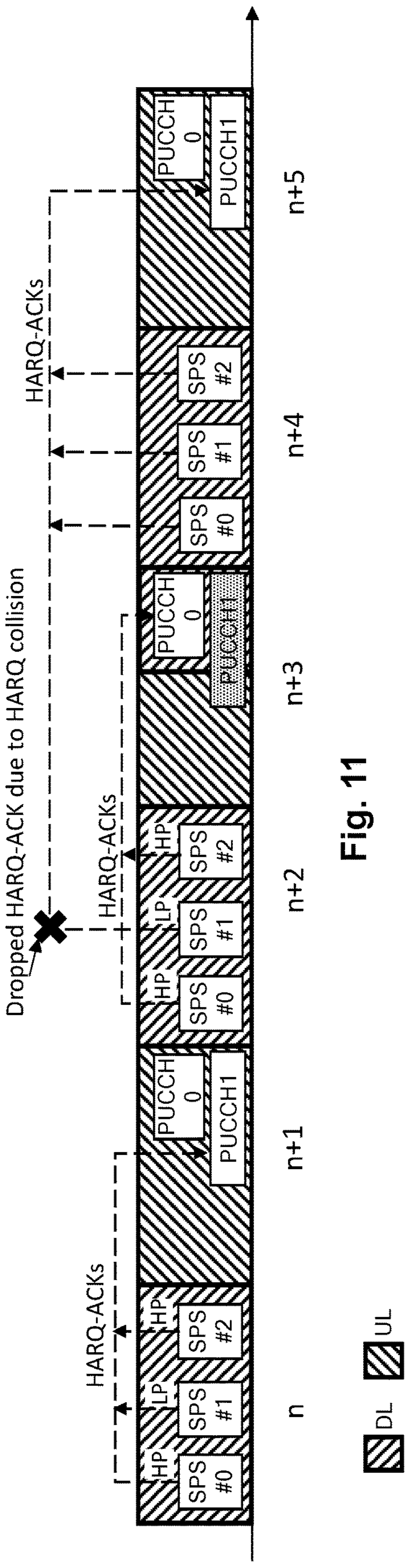
FIG. 11 is a schematic drawing illustrating exemplary priority-based UE behavior that takes into account QoS requirements in case of a collision of a transmission opportunity with a DL symbol.

Method 4 is now explained in more detail with reference to FIG. 11. In FIG. 11, the UE is configured with 3 SPS DL resources, each having a periodicity of 2 slots. And two sets of UL transmission opportunities, PUCH0 and PUCH1, and having a payload size of 2 and more than 2 bits, respectively. It is further assumed that SPS #1 is configured with a low priority (or a lower priority than SPS #0 and #2), while SPS #0 and SPS #2 have a high priority (or a higher priority than SPS #1).

In slot n+1, the UE selects PUCCH1 to carry the HARQ reports for PDSCHs of SPS #0 to SPS #2 received in slot n. In slot n+3, the PUCCH1 collides with DL symbol(s). Hence, the UE utilize PUCCH0 to carry the 2 bits of the HARQ reports of the HP DL traffics, i.e., HARQ reports associated with the traffic of SPS #0 and SPS #2 received in slot n+2. The UE needs to drop HARQ reports for PDSCH of SPS #1 received in slot n+2, as a new PDSCH with the same ID will be received in slot n+4.

Thus, using a traffic-based priorities of HARQ reports may facilitate a more efficient handling of different traffic types as low priority traffic may have less stringent QoS requirements, e.g., in terms of reliability.

Timing Information as Priority Criteria

In general, each SPS may be configured with a set of PDSCH-to-HARQ-ACK/NACK timing values, also known as k1 (values). In other words, a k1 value indicates an offset/time period, e.g., in terms of slots, between the time a DL transmission is received and the corresponding HARQ reports is to be transmitted. The UE may choose the first value from the timing set (sequence of timing/offset values with valid PUCCH/PUSCH resource for transmissions of the HARQ report.

In general, the priority criteria associated with a HARQ report (or with its process ID) may include a sequence of offset values that is associated with the HARQ process ID.

This may apply one HARQ report, to each of multiple HARQ reports, to each of HARQ report.

It is noted that the term sequence of offset values or timing sequence refers to an ordered list or an ordered set offset values, e.g., a plurality of offset values as well as a particular order of said offset values. In general, a sequence of offset values may include one or more offset values. In particular, the offset values may be or correspond to k1 values. Each offset value may indicate a time for transmitting the UCI relative to the reception of reception of the DL transmission to which the HARQ report refers (for which ACK or NACK is reported). Thus, for a given HARQ report and/or given reception of DL traffic, the sequence of offset values corresponds to a sequence of transmission times for transmitting the HARQ report. This sequence of transmission times may be ordered according to preference, e.g., from a most preferred transmission time to a least preferred transmission time.

Thus, in general, it may be determined that a transmission opportunity is to be used for transmitting the available UCI if the transmission opportunity corresponds to a first valid transmission time in one or more of the sequences (i.e., in/for at least one sequence) of transmission times of the HARQ reports. In other words, a first transmission time may not be the first transmission time among the transmissions times of a sequence in a temporal sense, but rather the first in the sequence that fulfils the criterion of being valid/not colliding. Here, the term valid refers to transmission times/opportunities that do not collide with any DL symbol as explained above. The UE may thus use the transmission opportunity for transmitting a HARQ report for which said transmission opportunity correspond to a first valid transmission time.

Accordingly, based on the priority criteria/timing sequences, it may be determined whether or not to defer transmission of any UCI until another UCI becomes available for transmission. It may thus be determined that a (or any, if there are multiple) next (in time) transmission opportunity is not to be used for transmitting the UCI. In general, it may also by determined that other (different from the currently available UCI) UCI is expected to be received (e.g., within a predetermined number of slots), and based on such determination tit may be decided to not use the next (in time) transmission opportunity(s). Accordingly, it may be determined to use another, subsequent transmission opportunity later, in time, than the next (in time) transmission opportunity(s) for transmitting said other UCI as well as the currently available UCI. In particular, it may be determined, after said next transmission opportunity has occurred that (i) said other UCI is available for transmission, and (ii) to use a subsequent transmission opportunity to transmit the available UCI and the other UCI.

Priority-based HARQ-ACK transmissions to limit UL control resource usage. The UE can be configured to restrict/limit its usage of UL resources for carrying UCI. For this purpose, the UE should transmit critical UCI type immediately, while it can defer the transmission of less critical UCI type to be multiplexed with other information.

Reducing UL Control Resource Usage

Figure 14:
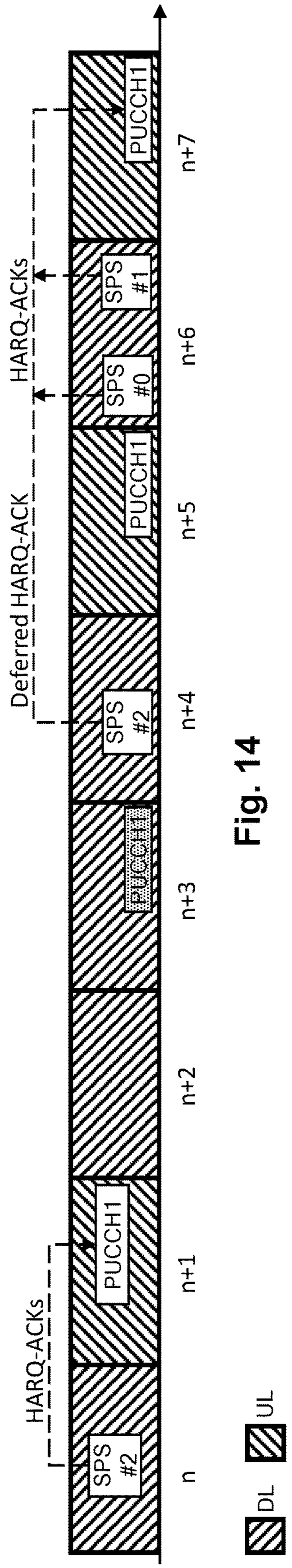
FIG. 14 is a schematic drawing illustrating exemplary UE behavior for reducing UL control resource usage.

As mentioned above, by using priority criteria including timing criteria/information UL resource and interference in the communication system may be reduced. This is further explained with reference to FIG. 14, in which the UE is configured with 3 SPS DL resources, denoted as SPS #1, SPS #2, and SPS #3. SPS #2 is periodic with a periodicity of 4 slots, whereas SPS #0 and #1 may have periodicity greater than 6 slots. The UE is further configured with the transmission opportunities given by PUCCH1, which is periodic with a periodicity of 2 slots.

The HARQ reports for SPS #0 and #1 need to be transmitted within 2 slots, while HARQ report for SPS #2 should be transmitted within 4 slots. In order to facilitate a reduction of UL resources, SPS #0 and #1 are each configured with the sequence of offset values {1, 2} (in terms of slots), while SPS #2 is configured with the sequence of offset values {4, 3, 2, 1}. In other words, the priority criteria include, for the HARQ process IDs associated with SPS #0, the sequence of offset values {1, 2}; for the HARQ process IDs associated with SPS #1, the sequence of offset values {1, 2}; and for the HARQ process IDs associated with SPS #2, the sequence of offset values {4, 3, 2, 1}.

The UE transmits the HARQ report for SPS #2 received in slot n in slot n+1, since the deferral of HARQ report to the next available slot (n+5) violates the latency requirement. More specifically, the UE transmits the HARQ report for SPS #2 received in slot n in slot n+1, which corresponds to the last entry of the sequence of offset values {4, 3, 2, 1} since: (i) there is no transmission opportunity in slots n+4 and n+2, corresponding to the first and third entry in the sequence of SPS #2, respectively; and (ii) the transmission opportunity in slot n+3, corresponding the second entry in the sequence of SPS #2. Since k1=4, 3, and 2 point to DL slots, in which UCI transmissions are not possible, k1=1 is the only a valid value from the sequence set of {4, 3, 2, 1} for SPS #2 received in slot n. Thus, using the configured timing information, the UE would select k1=1 for the HARQ report of the PDSCH of SPS #2 received in slot n.

However, the UE defers the HARQ report for SPS #2 received in slot n+4 to slot n+7 and transmits said HARQ report for SPS #2 using PUCH1 in slot n+7. In other words, the HARQ report for SPS #2 received in slot n+4 is multiplexed (e.g., transmitted together) with the HARQ reports of SPS #0 and SPS #1 received in slot n+6. More specifically, the UE determines that slot n+7 is to be used for transmitting the HARQ reports for the SPS #2 traffic received in slot n+4, since there is no transmission opportunity in slot n+8 (corresponding to the first offset value 4; i.e., n+4+4=n+8). Furthermore, the UE determines that slot n+7 is to be used for transmitting the HARQ report for the SPS #0 and SPS #1 traffic received in slot n+6, since slot n+7 corresponds to the first offset value 1 in the sequences of SPS #0 and #1 (i.e., n+6+1=n+7). Thus, using the configured timing information, the UE would select (i) k1=3 for the HARQ report of PDSCH of SPS #2 received in slot n+4, and (ii) for the HARQ report of the PDSCHs of SPS #0 and #1 received in slot n+6. In particular, the UE may determine that the transmission opportunity in slot n+5 is not to be used for transmitting the available UCI (i.e., HARQ report for SPS #2 received in slot n+4).

In case all PUCCH1 over slot n+7 cannot accommodate all 3 HARQs, the UE might consider other priority criteria. One approach could be that the UE decide to use PUCCH1 over slot n+5 to carry HARQ for SPS #2.

Thus, in general, if the payload size of an UL transmission opportunity has not sufficient payload size to transmit all UCIs said transmission opportunity is the preferred transmission time, which of said UCIs are to be transmitted using said transmission opportunity may be determined on other priority criteria (or, e.g., in a first in first out manner, i.e., the UCIs that became available first among the available UCI will be selected for said transmission opportunity). For instance, as explained with respect to FIGS. 12 and 13, the UCIs to be transmitted using said transmission opportunity may be selected based on priority values/indexes defined for said UCIs. Furthermore, other timing values may be taken into account. In other words, those UCIs for which no other valid timing value exists (i.e., no other k1 value in the corresponding sequence points to a valid transmission opportunity) may be selected. In particular, it may be determined that (in particular, if the first transmission opportunity does not have sufficient payload size for all UCIs that prefer said first transmission opportunity) it may be determined that a valid transmission opportunity that is not the first (most preferred) transmission opportunity of any UCI is to be used for transmitting the UCI. Thus, which UCI to transmit may be determined on the timing values/sequences and/or other priority criteria such as priority values.

The multiplexing of HARQ reports associated to SPS #0 and #2, carried by PUCCH1 over slot n+7, leads to less power consumption with more communication efficiency compared to the case that PUCCH1 is used over both slots n+5 and n+7. Using timing information as a priority criteria may thus help reducing the UE's power consumption and interference in the system.

Increasing Reliability of Certain UCI

In general, the priority criteria, in particular priorities, could also be defined to achieve different reliabilities for UCI content. That is, the reliabilities achieved for UCIs may depend on the type and/or content of the respective UCI. For instance, based on the priority criteria, it may be determined whether or not to transmit a piece of UCI in each of two or more of the transmission opportunities. In other words, depending on the type/content of a UCI, said UCI may be repeated (e.g., transmitted more than once, possibly using different redundancy versions or the like) or may not be repeated.

Figure 16:
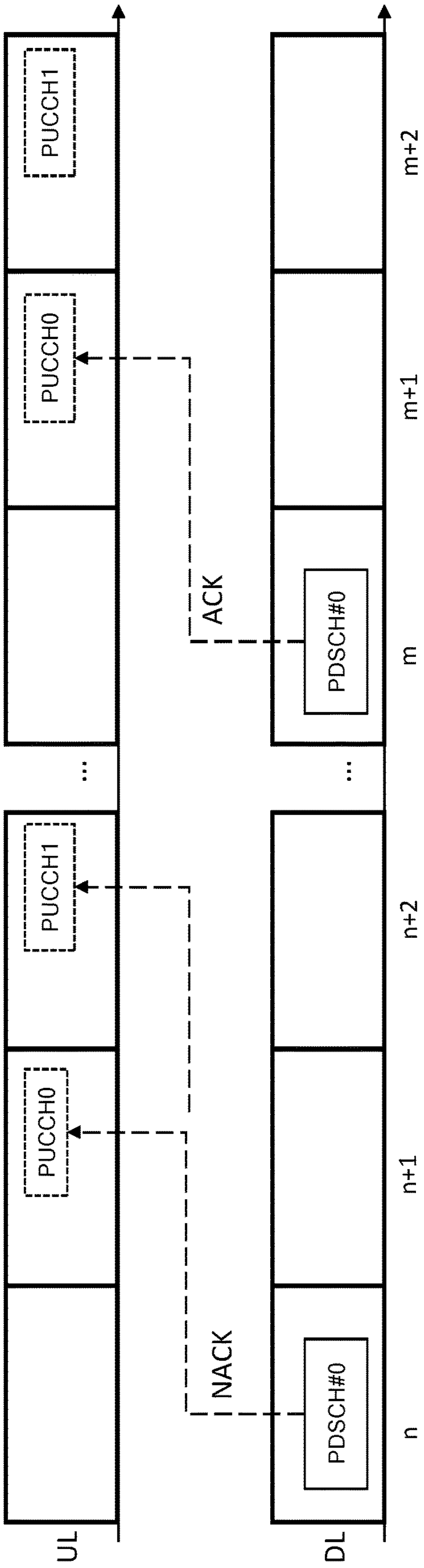
FIG. 16 is a schematic drawing illustrating exemplary priority-based UE behavior that enables a higher reliability of HARQ NACK by using different priority criteria for HARQ NACK and HARQ ACK.

For instance, as illustrated in FIG. 16, the UE may be configured to transmit a NACK signal using different or more resources to ensure a high reliability. The different resources could be additional UCI resource in time/frequency/code domains to achieve repetition/redundancy of transmissions for a higher reliability. While, an ACK signal can be transmitted using less resources. More specifically, in FIG. 16, the UE operates in Frequency Division Duplex (FDD) mode and is configured to transmit a NACK using both the next PUCCH0 as well as the next PUCCH1 transmission opportunity, while to transmit an ACK using only the next PUCCH0 transmission opportunity.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Furthermore, the various embodiments may also be implemented by means of software modules, which are executed by a processor or directly in hardware. Also a combination of software modules and a hardware implementation may be possible. The software modules may be stored on any kind of computer-readable storage media. In particular, according to another implementation, a non-transitory computer-readable recording medium is provided. The recording medium stores a program which, when executed by one or more processors, causes the one or more processors to carry out the steps of a method according to the present disclosure.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

It should be further noted that the individual features of the different embodiments may individually or in arbitrary combination be subject matter to another embodiment. It would be appreciated by a person skilled in the art that numerous variations and/or modifications may be made to the present disclosure as shown in the specific embodiments. The present embodiments are, therefore, to be considered in all respects to be illustrative and not restrictive.

Further Aspects

According to a first aspect, a user equipment (UE) is provided. The UE comprises circuitry which, in operation: (i) obtains an indication indicating a plurality of transmission opportunities for transmission of Uplink Control Information (UCI); (ii) determines that UCI is available for transmission; and (iii) determines, based on priority criteria associated with the available UCI, whether or not to use a transmission opportunity among the plurality of transmission opportunities for transmitting the available UCI. Furthermore, the UE comprises a transceiver which, in operation, uses the transmission opportunity for transmitting the available UCI if it is determined that the transmission opportunity is to be used for transmitting the available UCI.

In an exemplary implementation of the first aspect, the available UCI includes a plurality of pieces of UCI; the priority criteria include, for each of the pieces of UCI, a respective priority; and the priority of one of the pieces of the UCI depends on (i) a type and/or content of the one piece of the UCI, and/or (ii) an indication of the priority received by the transceiver.

For instance, the circuitry, in operation, determines (i) if it is determined that the transmission opportunity is to be used for transmitting the available UCI and a payload size of the available UCI is larger than a payload size of the transmission opportunity, based on the priority criteria, which of the plurality of pieces of UCI are to be transmitted in the transmission opportunity; and/or (ii), if it is determined that the transmission opportunity is to be used for transmitting the available UCI and a payload size of the available UCI is equal to or smaller than a payload size of the transmission opportunity, that all of the plurality of pieces of UCI are to be transmitted in the transmission opportunity.

In general, in implementations of the first aspect, the available UCI may comprise one or more hybrid automatic repeat request (HARQ) reports, wherein each HARQ report is associated with downlink (DL) traffic of a certain HARQ process ID. Furthermore, in general, the priority criteria may include, for each of the HARQ reports, a priority of the HARQ report, wherein the priority of the HARQ report depends on (i) a periodicity of the DL traffic associated with the HARQ report, (ii) a length of a time period until a next instance of DL traffic having the same HARQ process ID as the certain HARQ process ID is expected to be received, (iii) whether the HARQ report is acknowledgement, ACK, or an HARQ negative-acknowledgement, NACK, and/or (iv) a priority of said DL traffic.

For example, for each of the HARQ reports, the priority of the HARQ report (i) increases with increasing periodicity of the DL traffic, (ii) increases with decreasing length of the time period until the next instance of the DL traffic is expected to be received, (iii) is higher when the HARQ report is an HARQ NACK than when the HARQ report is an HARQ ACK, and/or (iv) increases with increasing priority of the DL traffic associated with the HARQ report.

In general, in implementations of the first aspect, the UE may be configured with one or more Semi-Persistent Scheduling (SPS) configurations, wherein (i) the configured SPS configurations correspond to respective DL SPS traffics and are associated with respective certain HARQ process IDs; and (ii) the DL traffics which are associated with the HARQs are the DL SPS traffics.

In general, in implementations of the first aspect, (i) the available UCI may comprise one or more hybrid automatic repeat request (HARQ) reports wherein each HARQ report is associated with downlink (DL) traffic of a certain HARQ process ID; (ii) the priority criteria may include, for each of the HARQ reports, a sequence of offset values that is associated with the HARQ process ID and indicates, relative to a time of reception of the DL traffic, a corresponding sequence of transmission times for transmitting the HARQ report; (iii) the circuitry, in operation, may determine that the transmission opportunity is to be used for transmitting the available UCI if the transmission opportunity corresponds to a first transmission time in one or more of the sequences of transmission times of the HARQ reports that does not collide with any DL symbol; and (iv) the transceiver, in operation, may use, the transmission opportunity for transmitting a HARQ report for which the transmission opportunity correspond to a first transmission time.

In general, in implementations of the first aspect, the transceiver, in operation, may receive an indication indicating the priority criteria: (i) as part of a Semi-Persistent Scheduling (SPS) configuration, (ii) in a Radio Resource Control (RRC) signalling, (iii) in a Physical Downlink Shared Channel (PDSCH), (iv) in a Physical Downlink Control Channel (PDCCH), and/or (v) in a Downlink Control Information (DCI).

In general, in implementations of the first aspect, (i) the transmission opportunity may be a next transmission opportunity among the transmission opportunities; and (ii) the circuitry, in operation, may determine, based on the priority criteria, whether or not to defer transmission of any UCI until another UCI becomes available for transmission, wherein the other UCI is an UCI different from the available UCI.

For example the circuitry, in operation, may determine, after the transmission opportunity (i) that the other UCI is available for transmission, and (ii) to use a subsequent transmission opportunity to transmit the available UCI and the other UCI, wherein the subsequent transmission opportunity is a transmission opportunity among the transmission opportunities that is after the transmission opportunity; and the transceiver, in operation, may use the subsequent transmission opportunity to transmit the available UCI and the other UCI.

In general, in implementations of the first aspect, the circuitry, in operation, may determine, based on the priority criteria, whether or not to transmit the piece of UCI in each of two or more of the transmission opportunities.

In general, in implementations of the first aspect, (i) the UE may be operating in Time Division Duplex (TDD); and (ii) the circuitry, in operation, may determine, if the transmission opportunity collides with one or more DL symbols that the transmission opportunity is not to be used for transmitting the available UCI.

According to a second aspect, a scheduling device is provided. The scheduling device comprises circuitry which, in operation (i) determines priority criteria based on which it is to be determined whether or not to use a transmission opportunity among the plurality of transmission opportunities for transmitting available Uplink Control Information (UCI), (ii) generates a first signalling information including an indication indicating the priority criteria, (iii) determines a plurality of transmission opportunities for transmission of UCI, and (iv) generates a second signalling information including an indication indicating the plurality of transmission opportunities. Furthermore, the scheduling device comprises a transceiver which, in operation (i) transmits the first signalling information, and (ii) transmits the second signalling information.

According to a third aspect, a method for a user equipment (UE) is provided. The method includes the steps of (i) obtaining an indication indicating a plurality of transmission opportunities for transmission of Uplink Control Information (UCI), (ii) determining that UCI is available for transmission; (iii) determining, based on priority criteria associated with the available UCI, whether or not to use a transmission opportunity among the plurality of transmission opportunities for transmitting the available UCI; and (iv), if it is determined that the transmission opportunity is to be used for transmitting the available UCI, using the transmission opportunity for transmitting the available UCI.

According to a fourth aspect, a method for a scheduling device is provided. The method includes the steps of (i) determining priority criteria based on which it is to be determined whether or not to use a transmission opportunity among the plurality of transmission opportunities for transmitting available Uplink Control Information (UCI); (ii) generating a first signalling information including an indication indicating the priority criteria; (iii) transmitting the first signalling information; (iv) determining a plurality of transmission opportunities for transmission of UCI; (v) generating a second signalling information including an indication indicating the plurality of transmission opportunities; and (vi) transmitting the second signalling information.

According to a fifth aspect, a scheduling device is provided. The scheduling device comprises a transceiver which, in operation: (i) transmits a signalling information including an indication indicating a plurality of transmission opportunities for transmission of Uplink Control Information (UCI); and (ii) receives, in one of the transmission opportunities, one or more pieces of UCI. Furthermore, the scheduling device comprises circuitry which, in operation (i) generates the signalling information; and (ii) determines, based on priority criteria associated with the UCI, for each of the one or more received pieces of UCI, a UCI type of the received piece of UCI.

In implementations of the fifth aspect, the circuitry, in operation, may (i) determine which pieces of UCI were available for transmission by a UE having transmitted the one or more pieces of UCI; and (ii) determine for each of the one or more received pieces of UCI, based on the priority criteria and the available pieces of UCI, the UCI type of the received piece of UCI.

For example, in implementations of the fifth aspect, the circuitry, in operation, may determine, in the determining of the UCI types, if one or more of the received pieces of UCI are hybrid automatic repeat request (HARQ) reports, for each of said one or more received pieces, a HARQ process ID of downlink (DL) traffic that is associated with the HARQ report.

In general, in implementations of the fifth aspect, the priority criteria include, for each of the available pieces of UCI that is a HARQ report, a priority of the HARQ report, wherein the priority of the HARQ report depends on (i) a periodicity of the DL traffic, (ii) a length of a time period until a next instance of DL traffic having the same HARQ process ID as the certain HARQ process ID is expected to be received, (iii) whether the HARQ report is an acknowledgement, ACK, or an HARQ negative-acknowledgement, NACK, and/or (iv) a priority of said DL traffic.

According to a sixth aspect, a method for a scheduling device is provided. The method includes the steps of (i) generating a signalling information including an indication indicating a plurality of transmission opportunities for transmission of UCI; (ii) transmitting the generated signalling information; (iii) receiving, in one of the transmission opportunities, one or more pieces of UCI; and (iv) determining, based on priority criteria associated with the UCI, for each of the one or more pieces of UCI, a UCI type of the piece of UCI.

In implementations of the sixth aspect, the method may further include the steps of (i) determining which pieces of UCI were available for transmission by a UE having transmitted the one or more pieces of UCI; and (ii) determining, for each of the one or more received pieces of UCI, based on the priority criteria and the available pieces of UCI, the UCI type of the received piece of UCI.

For example, in implementations of the sixth aspect, if one or more of the received pieces of UCI are hybrid automatic repeat request (HARQ) reports, the determining of the UCI type may include, for each of said one or more received pieces, determining a HARQ process ID of DL traffic that is associated with the HARQ report.

In general, in implementations of the sixth aspect, the priority criteria may include, for each of the available pieces of UCI that is a HARQ report, a priority of the HARQ report, wherein the priority of the HARQ report depends on (i) a periodicity of the DL traffic, (ii) a length of a time period until a next instance of DL traffic having the same HARQ process ID as the certain HARQ process ID is expected to be received, (iii) whether the HARQ report is an acknowledgement (ACK) or aa negative-acknowledgement (NACK), and/or (iv) a priority of said DL traffic.

Summarizing, provided are a communication apparatus, a network node, and corresponding methods. The communication device obtains an indication indicating a plurality of transmission opportunities for transmission of UCI. If UCI becomes available for transmission, the communication device determines, based on priority criteria associated with the available UCI, whether to use a transmission opportunity among the plurality of transmission opportunities for transmitting the available UCI. If it is determined that the transmission opportunity is to be used for transmitting the available UCI, the communication device uses the transmission opportunity for transmitting the available UCI.

The invention claimed is:

1. A user equipment (UE), comprising:

circuitry which, in operation:

obtains an indication indicating a plurality of transmission opportunities for transmission of Uplink Control Information (UCI), determines that UCI is available for transmission, and determines, based on priority criteria associated with the available UCI, whether or not to use a transmission opportunity among the plurality of transmission opportunities for transmitting the available UCI, and a transceiver which, in operation, uses the transmission opportunity for transmitting the available UCI if it is determined that the transmission opportunity is to be used for transmitting the available UCI, wherein the available UCI includes a plurality of pieces of UCI, the priority criteria include a respective priority for each piece of UCI, the respective priorities are configured to achieve different reliabilities for different pieces of UCI, and the circuitry, in operation, determines, based on the priority criteria, whether or not to repeatedly transmit one piece of UCI of the pieces of UCI in each of two or more of the transmission opportunities based on the reliability to be achieved for the one piece of UCI.

2. The UE according to claim 1, wherein the priority of the one piece of UCI depends on:

a type and/or content of the one piece of UCI, and/or an indication of the priority received by the transceiver.

3. The UE according to claim 2, wherein the circuitry, in operation:

if it is determined that the transmission opportunity is to be used for transmitting the available UCI and a payload size of the available UCI is larger than a payload size of the transmission opportunity, determines, based on the priority criteria, which of the plurality of pieces of UCI are to be transmitted in the transmission opportunity; and/or if it is determined that the transmission opportunity is to be used for transmitting the available UCI and a payload size of the available UCI is equal to or smaller than a payload size of the transmission opportunity, determines that all of the plurality of pieces of UCI are to be transmitted in the transmission opportunity.

4. The UE according to claim 1, wherein the available UCI comprises one or more hybrid automatic repeat request (HARQ) reports, wherein each HARQ report is associated with downlink (DL) traffic of a certain HARQ process ID; and the priority criteria include, for each of the HARQ reports, a priority of the HARQ report, wherein the priority of the HARQ report depends on:

a periodicity of the DL traffic associated with the HARQ report, a length of a time period until a next instance of the DL traffic associated with the HARQ report having the same HARQ process ID as the certain HARQ process ID is expected to be received, whether the HARQ report is an acknowledgement (ACK) or a negative-acknowledgement (NACK), and/or a priority of said DL traffic associated with the HARQ report.

5. The UE according to claim 4, wherein, for each of the HARQ reports, the priority of the HARQ report:

increases with increasing periodicity of the DL traffic associated with the HARQ report, increases with decreasing length of the time period until the next instance of the DL traffic associated with the HARQ report is expected to be received, is higher when the HARQ report is a NACK than when the HARQ report is an ACK, and/or increases with increasing priority of the DL traffic associated with the HARQ report.

6. The UE according to claim 4, wherein the UE is configured with one or more Semi-Persistent Scheduling (SPS) configurations, wherein the configured SPS configurations correspond to respective DL SPS traffics and are associated with respective certain HARQ process IDs; and the DL traffics which are associated with the HARQs are the DL SPS traffics.

7. The UE according to claim 1, wherein the available UCI comprises one or more hybrid automatic repeat request (HARQ) reports wherein each HARQ report is associated with downlink (DL) traffic of a certain HARQ process ID; and the priority criteria include, for each of the HARQ reports, a sequence of offset values that is associated with the HARQ process ID and indicates, relative to a time of reception of the DL traffic, a corresponding sequence of transmission times for transmitting the HARQ report;

the circuitry, in operation, determines that the transmission opportunity is to be used for transmitting the available UCI if the transmission opportunity corresponds to a first transmission time in one or more of the sequences of transmission times of the HARQ reports that does not collide with any DL symbol; and the transceiver, in operation, uses the transmission opportunity for transmitting a HARQ report, for which the transmission opportunity corresponds to the first transmission time.

8. The UE according to claim 1, wherein the transceiver, in operation, receives an indication indicating the priority criteria:

as part of a Semi-Persistent Scheduling (SPS) configuration, in a Radio Resource Control (RRC) signalling, in a Physical Downlink Shared Channel (PDSCH), in a Physical Downlink Control Channel (PDCCH), and/or in a Downlink Control Information (DCI).

9. The UE according to claim 1, wherein the transmission opportunity is a next transmission opportunity among the transmission opportunities; and the circuitry, in operation, determines, based on the priority criteria, whether or not to defer transmission of any UCI until another UCI becomes available for transmission, wherein the other UCI is an UCI different from the available UCI.

10. The UE according to claim 9, wherein the circuitry, in operation, determines, after the transmission opportunity:

that the other UCI is available for transmission, and to use a subsequent transmission opportunity to transmit the available UCI and the other UCI, wherein the subsequent transmission opportunity is a transmission opportunity among the transmission opportunities that is after the transmission opportunity; and the transceiver, in operation, uses the subsequent transmission opportunity to transmit the available UCI and the other UCI.

11. The UE according to claim 1, wherein the UE is operating in Time Division Duplex (TDD);

the circuitry, in operation, determines, if the transmission opportunity collides with one or more DL symbols that the transmission opportunity is not to be used for transmitting the available UCI.

12. A method for a user equipment (UE), the method including the steps of:

obtaining an indication indicating a plurality of transmission opportunities for transmission of Uplink Control Information (UCI);

determining that UCI is available for transmission;

determining, based on priority criteria associated with the available UCI, whether or not to use a transmission opportunity among the plurality of transmission opportunities for transmitting the available UCI;

if it is determined that the transmission opportunity is to be used for transmitting the available UCI, using the transmission opportunity for transmitting the available UCI, wherein the available UCI includes a plurality of pieces of UCI, the priority criteria include a respective priority for each piece of UCI, the respective priorities are configured to achieve different reliabilities for different pieces of UCI; and determining, based on the priority criteria, whether or not to repeatedly transmit one piece of UCI of the pieces of UCI in each of two or more of the transmission opportunities based on the reliability to be achieved for the one piece of UCI.

13. An integrated circuit for controlling operation of a user equipment (UE), comprising:

control circuitry configured to:

obtain an indication indicating a plurality of transmission opportunities for transmission of Uplink Control Information (UCI);

determine that UCI is available for transmission;

determine, based on priority criteria associated with the available UCI, whether or not to use a transmission opportunity among the plurality of transmission opportunities for transmitting the available UCI; and transmission circuitry configured to control transmitting the available UCI using the transmission opportunity if it is determined that the transmission opportunity is to be used for transmitting the available UCI, wherein the available UCI includes a plurality of pieces of UCI, the priority criteria include a respective priority for each piece of UCI, the respective priorities are configured to achieve different reliabilities for different pieces of UCI, and the control circuitry is configured to determine, based on the priority criteria, whether or not to repeatedly transmit one piece of UCI of the pieces of UCI in each of two or more of the transmission opportunities based on the reliability to be achieved for the one piece of UCI.

* * * * *